(12) United States Patent
Kim et al.

(10) Patent No.: US 12,271,538 B2
(45) Date of Patent: Apr. 8, 2025

(54) STYLUS PEN AND TOUCH SYSTEM INCLUDING THE SAME

(71) Applicant: HiDeep, Inc., Seongnam-si (KR)

(72) Inventors: Seyeob Kim, Seongnam-si (KR); Hojun Moon, Seongnam-si (KR); Mun Sub Byun, Seongnam-si (KR)

(73) Assignee: HIDEEP, INC., Seongnam-si (KR)

( * ) Notice: Subject to any disclaimer, the term of this patent is extended or adjusted under 35 U.S.C. 154(b) by 0 days.

(21) Appl. No.: 18/133,608

(22) Filed: Apr. 12, 2023

(65) Prior Publication Data

US 2023/0333673 A1 Oct. 19, 2023

(30) Foreign Application Priority Data

Apr. 14, 2022 (KR) .................. 10-2022-0046523
Aug. 2, 2022 (KR) .................. 10-2022-0096383

(51) Int. Cl.

| | |
|---|---|
| *G06F 3/03* | (2006.01) |
| *G06F 3/0354* | (2013.01) |
| *G06F 3/038* | (2013.01) |
| *G06F 3/041* | (2006.01) |
| *G06F 3/046* | (2006.01) |

(52) U.S. Cl.
CPC ........ *G06F 3/03545* (2013.01); *G06F 3/0383* (2013.01); *G06F 3/04162* (2019.05); *G06F 3/046* (2013.01); *G06F 2203/04108* (2013.01)

(58) Field of Classification Search
CPC ............ G06F 3/03545; G06F 3/04162; G06F 3/0383; G06F 3/046; G06F 2203/04108; G06F 3/038; G06F 3/0354; H02J 50/00; H02J 50/10
See application file for complete search history.

(56) References Cited

U.S. PATENT DOCUMENTS

| | | | |
|---|---|---|---|
| 5,576,502 A | 11/1996 | Fukushima et al. | |
| 8,304,671 B2 | 11/2012 | Fukushima et al. | |
| 9,207,784 B2 | 12/2015 | Wong et al. | |
| 11,048,359 B2 | 6/2021 | Xi et al. | |
| 2003/0141119 A1 | 7/2003 | Chao et al. | |
| 2009/0084614 A1 | 4/2009 | Fukushima et al. | |
| 2014/0152627 A1 | 6/2014 | Wong et al. | |
| 2015/0049052 A1* | 2/2015 | Atkinson | G06F 3/04162 345/174 |
| 2015/0070330 A1 | 3/2015 | Stern | |
| 2017/0277284 A1* | 9/2017 | Kim | G06F 3/03545 |
| 2017/0285772 A1* | 10/2017 | Yamamoto | G06F 3/03545 |
| 2018/0039345 A1* | 2/2018 | Obata | G06F 3/03545 |
| 2018/0101272 A1 | 4/2018 | Xi et al. | |

FOREIGN PATENT DOCUMENTS

| | | |
|---|---|---|
| CN | 105607766 | 5/2016 |
| EP | 2045696 | 4/2009 |
| TW | 201421300 | 6/2014 |

\* cited by examiner

*Primary Examiner* — Michael A Faragalla
(74) *Attorney, Agent, or Firm* — LEX IP MEISTER, PLLC

(57) ABSTRACT

According to an example embodiment, a stylus pen may include an inductor including a core body, ferrite core, a coil wound on an outer surface of the ferrite core, and a magnetic body spaced apart from the ferrite core by pressure applied to the core body.

16 Claims, 21 Drawing Sheets

(a) Hover                    (b) Pressure (a) Hover  (b) Pressure (a) Hover  (b) Pressure (a) Hover
(b) Pressure (a) Hover  (b) Pressure (a) Hover　　　　(b) Pressure

STYLUS PEN AND TOUCH SYSTEM INCLUDING THE SAME

CROSS-REFERENCE TO RELATED APPLICATION

This application claims priority to and the benefit of Korean Patent Application No. 10-2022-0046523 filed in the Korean Intellectual Property Office on Apr. 14, 2022, and Korean Patent Application No. 10-2022-0096383 filed in the Korean Intellectual Property Office on Aug. 2, 2022, the entire contents of which are incorporated herein by reference.

BACKGROUND

(a) Field

The present disclosure relates to a stylus pen and a touch system including the same.

(b) Description of the Related Art

Touch sensors are provided in various electronic devices such as a mobile phone, a smart phone, a laptop computer, a digital broadcasting terminal, personal digital assistants, a portable multimedia player (PMP), a navigation, a slate PC, a tablet PC, an ultrabook, and a wearable device.

In these electronic devices, the touch sensor can be located on a display panel that displays an image or can be located in a part of the electronic device. A user touches the touch sensor and interacts with the electronic device, so the electronic device can provide an intuitive user interface to the user.

The user can use a stylus pen for sophisticated touch input. Such a stylus pen can transmit and receive signals to and from the touch sensor through electrical and/or magnetic schemes.

SUMMARY OF THE INVENTION

Example embodiments attempt to provide a stylus pen capable of detecting pen pressure in a simple structure.

Example embodiments attempt to provide a stylus pen capable of distinguishing a contact state of the stylus pen to a touch device.

An example embodiment of the present disclosure provides a stylus pen which may include: a core body and a resonant circuit, and the resonant circuit may include a ferrite core, a coil wound on an outer surface of the ferrite core, and a magnetic body spaced apart from the ferrite core by pressure applied to the core body.

In the stylus pen, as the pressure increases. a spacing distance between the magnetic body and the ferrite core may increase.

A resonant frequency of the resonant circuit may increase as the pressure increases.

The ferrite core may include a through-hole which is penetrated in a first direction and accommodates at least a part of the core body. The core body may include a first end portion delivering the pressure to the magnetic body and a second end portion serving as a tip of the stylus pen and may move in the first direction inside the through-hole by pressure applied to the second end portion.

The stylus pen may further include a housing accommodating at least a part of the core body and the resonant circuit. The ferrite core may be fixed inside the housing.

The through-hole may include a first opening located on one surface of the ferrite core and a second opening located on the other surface of the ferrite core. The second end portion may be exposed to the outside of the ferrite core through the first opening, and the first end portion may deliver the pressure to the magnetic body through the second opening.

The resonant circuit may further include a first capacitor. The stylus pen may further include a switching member that switches an electrical connection between the first capacitor and the coil according to the pressure applied to the core body.

The switching member may include a movable part installed to be movable inside the housing of the stylus pen, and a fixation part installed to maintain a fixed position inside the housing. A contact state of the movable part with the fixation part may be changed by the pressure applied to the core body.

The movable part may maintain the state of contacting the fixation part when there is no pressure applied to the second end portion and may be spaced apart from the fixation part when the pressure is applied to the second end portion. The first capacitor may be electrically connected to the coil when the movable part and the fixation part are in contact with each other.

The movable part may be located between the magnetic body and the ferrite core, and the fixation part may be located between the movable part and the ferrite core.

The fixation part may be located between the movable part and the ferrite core and may include a through-hole into which the magnetic body is inserted. The magnetic body may be located between the movable part and the ferrite core and disposed to be movable inside the through-hole.

The stylus pen may further include at least one first contact located in the movable part, and electrically connected to the first capacitor; and at least one second contact located in the fixation part, and electrically connected to the coil. An electrical connection between the at least one first contact and the at least one second contact may be switched according to the contact state of the movable part and the fixation part.

The stylus pen may further include at least one first contact located in the fixation part, and electrically connected to the first capacitor; and at least one second contact located in the movable part, and electrically connected to the coil. An electrical connection between the at least one first contact and the at least one second contact may be switched according to the contact state of the movable part and the fixation part.

The stylus pen may further include: at least one first contact located in the fixation part, and electrically connected to the first capacitor; at least one second contact located in the fixation part, and electrically connected to the coil; and at least one third contact located in the movable part, and switching the electrical connection between the at least one first contact and the at least second contact according to the contact state between the movable part and the fixation part. The at least one third contact may electrically connect the at least one first contact to the at least one second contact in a state in which the movable part and the fixation part are in contact with each other and block the electrical connection between the at least one first contact and the at least one second contact in a state in which the movable part and the fixation part are spaced apart from each other.

The resonant circuit may further include a second capacitor electrically connected to the coil. The first capacitor may be connected to the second capacitor in parallel when the movable part and the fixation part are in contact with each other.

The stylus pen may further include a fixation member limiting displacement of the core body inside the housing of the stylus pen, and an elastic member located between the fixation member and the magnetic body.

Another example embodiment of the present disclosure provides a touch system which may include: the stylus pen; and a touch apparatus, and the touch apparatus may output a first electromagnetic signal to the stylus pen, receive a resonated second electromagnetic signal from the stylus pen, and detect pressure applied to a core body of the stylus pen.

According to example embodiments, there is a merit that manufacturing cost of a stylus pen capable of detecting pen pressure can be reduced.

According to example embodiments, there is an advantage of being able to accurately measure the pen pressure by the stylus pen.

DETAILED DESCRIPTION OF THE EMBODIMENTS

Figure 1:
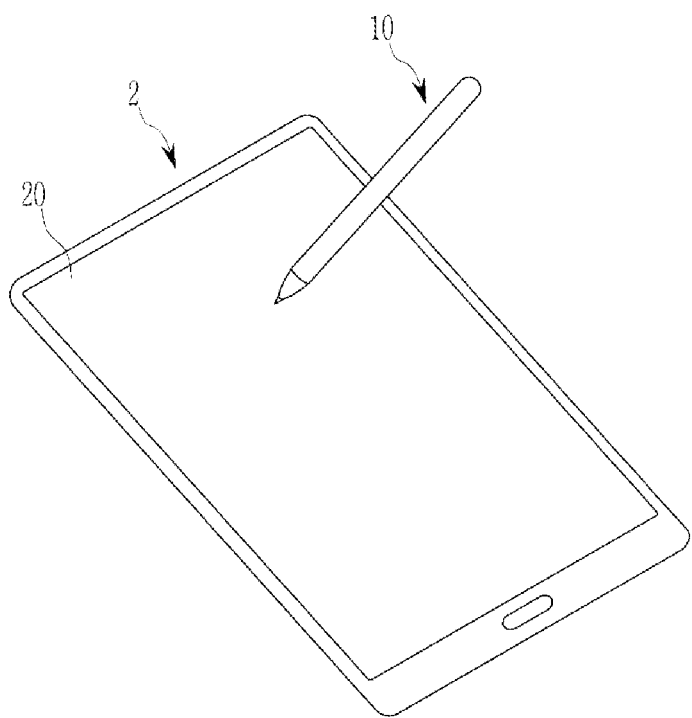
FIG. 1 is a conceptual view illustrating a stylus pen and an electronic device.

Hereinafter, various example embodiments of the present disclosure will be described with reference to the accompanying drawings. However, this should be understood that the technology described herein is not limited to a specific example embodiment, and it should be understood that it includes various modifications, equalities, and/or alternatives of the present disclosure. In connection with the description of the drawings, similar reference numerals may be used for similar components.

In addition, each configuration illustrated in the drawings is arbitrarily shown for understanding and ease of description, but the present invention is not limited thereto. In the drawings, the thickness of layers, films, panels, regions, etc., are exaggerated for clarity. In addition, in the drawings, for convenience of description, thicknesses of a part and an area are exaggeratedly illustrated.

Further, it will be understood that when an element such as a layer, film, region, or substrate is referred to as being "on" another element, it can be directly on the other element or intervening elements may also be present. In contrast, when an element is referred to as being "directly on" another element, there are no intervening elements present. In addition, to be referred to as "on" or "on" a reference portion is located above or below the reference portion and does not particularly mean to "above" or "on" the direction opposite to gravity.

In the present disclosure, expressions such as "have", "can have", "include", or "can include" indicates the presence of the corresponding features (e.g., components such as, numerical value, function, operation, or part), and does not exclude the presence of additional features.

In the present disclosure, expressions such as "A or B", "at least one of A and/or B", OR "one or more of A or/and B" may include all possible combinations of items listed together. For example, "A or B", "at least one of A and B", or "at least one of A or B" may refer to all cases of (1) including at least one A, (2) including at least one B, or (3) including both at least one A and at least one B.

Expressions such as "first" and "second" used in the present disclosure can modify various components regardless of their order and/or importance, and will be used only to distinguish one component from another component, but are not limit the components. For example, a first user device and a second user device may represent different user devices regardless of the order or the importance. For example, a first component may be referred to as a second component, and similarly, the second component may be changed and referred to as the first component without departing from the scope disclosed the present disclosure.

When any component (e.g., a first component) is referred to as being "(operatively or communicatively) coupled with/ to" or "connected to" to the other component (e.g., a second component), it will be understood that the component may be directly connected to the other component or may be connected to the other component through another component (e.g., a third component). When any component (e.g., a first component) is referred to as being "directly coupled"

or "directly connected" to the other component (e.g., a second component), it will be understood that another component (e.g., a third component) does not exist between any component and the other component.

An expression "configured to" used in the present disclosure may be used interchangeably with, for example, "suitable for," "having the capacity to," "designed to", "adapted to", "made to", or "capable of" depending on the situation. The term "configured to" may not particularly mean only "specifically designed to" in terms of hardware. Instead, in some situations, the expression "a device configured to" may mean that the device is "capable of" together with other devices or parts. For example, the phrase "a processor configured to perform A, B, and C" may mean a dedicated processor (e.g., an embedded processor) for performing the corresponding operation, or a generic-purpose processor (e.g., a CPU or application processor) capable of performing the corresponding operations by executing one or more software programs stored in a memory device.

The terms used in the present disclosure are used to describe a specific example embodiment and may not be intended to limit the scope of other example embodiments. A singular form may include a plural form unless otherwise clearly meant in the contexts. The terms used herein, including technical or scientific terms, may have the same meaning as generally understood by those of ordinary skill in the art described in the present disclosure. The terms defined in the general dictionary of the terms used in the present disclosure can be interpreted as the same or similar meaning as the context of the relevant technology, and unless defined clearly in the present disclosure, the terms are not interpreted as ideal or excessive formal meanings. In some cases, even a term defined in the present disclosure cannot be interpreted to exclude the embodiments of the present disclosure.

Electronic devices according to various example embodiments of the present disclosure may include at least one of a smart phone, a tablet personal computer (PC), a mobile phone, an image phone, an e-book reader, a laptop personal computer (PC), a netbook computer, a mobile medical device, a camera, or a wearable device, for example. According to various example embodiments, the wearable device may include at least one of an accessory type (e.g., watches, rings, bracelets, anklets, necklaces, glasses, contact lenses, or head-mounted-device (HMD)), a fabric or clothing integrated type (e.g., electronic clothing), a body attachment type (e.g., skin pads or tattoos), or a bio implantation type (e.g., implantable circuit).

Hereinafter, a stylus pen and a touch system according to example embodiments will be described by referring to the required drawings.

FIG. 1 is a conceptual view illustrating a stylus pen and an electronic device.

Referring to FIG. 1, a stylus pen 10 may receive a signal output from an electronic device 2 or a touch screen 20 near the touch screen 20 of the electronic device 2 and transmit the signal to the touch screen 20.

Figure 2:
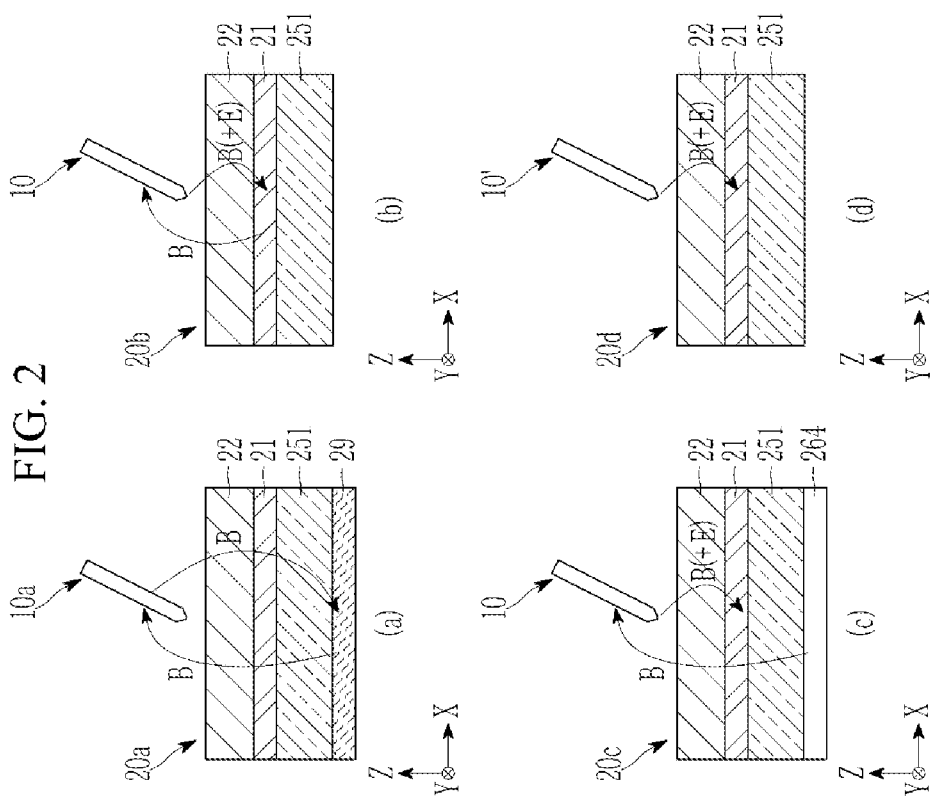
FIG. 2 is a diagram schematically illustrating a signal delivery operation between the stylus pen and the electronic device.

FIG. 2 is a diagram schematically illustrating a signal delivery operation between the stylus pen and the electronic device.

Referring to FIG. 2A, a touch screen 20a includes a digitizer 29, a display panel 251, a touch electrode layer 21, and a window 22.

In the case of an electro-magnetic resonance (EMR)-scheme pen among passive stylus pens, when the digitizer 29 delivers a magnetic signal B to an EMR-scheme stylus pen 10a, a resonant circuit included in the stylus pen 10a resonates with the magnetic signal B. Then, the digitizer 29 receives the resonant magnetic signal B from the stylus pen 10a.

The digitizer 29 may be attached under the display panel 251 and may be configured by a flexible printed circuit board (FPCB) having a plurality of conductive antenna loops. The digitizer 29 is coupled to a magnetic field shielding sheet (not illustrated) that blocks a magnetic field generated by the antenna loop and blocks an eddy current which may be generated in another electrical element and component when the antenna loop forms the magnetic field.

In the digitizer 29, a plurality of antenna loops for sensing a location into which the resonant signal is input is constituted by a plurality of layers. One antenna loop has a form of overlapping at least one other antenna loop in a Z-axis direction. As a result, the thickness of the FPCB is large. Therefore, when using the digitizer 29, thinning and downsizing the electronic device 2 are difficult.

When the digitizer 29 is mounted on a foldable/flexible electronic device 2, deformation may be generated in the FPCB attached to an area that is folded when folding is generated. Repetitive folding may give a stress on a wiring member forming the antenna loop, and eventually cause damage to the wiring member. The magnetic field shielding sheet blocks the impact of the magnetic field generated by the antenna loop inside the electronic device 2. The magnetic field shielding sheet is also thick, and the deformation is easily generated when the folding of the electronic device 2 is generated and may be damaged by the repetitive folding.

Referring to FIG. 2B, a touch screen 20b includes a display panel 251, a touch electrode layer 21, and a window 22.

In the case of the stylus pen 10 including the resonant circuit, when an electrode of the touch electrode layer 21 delivers the magnetic signal B to the stylus pen 10, the resonant circuit contained in the stylus pen 10 resonates with the magnetic signal B. Then, the electrode of the touch electrode layer 21 may be input with a resonant electromagnetic signal E and/or B from the stylus pen 10. When the electrode of the touch electrode layer 21 is formed by a metal mesh with a small resistance, it is possible to detect the magnetic signal from the stylus pen 10.

Similarly, compared to the digitizer 29, the touch screen 20b does not require an additional unit or module for delivering the magnetic signal to the stylus pen 10, so thinning the touch screen 20b is possible, and has a merit even in manufacturing cost.

Referring to FIG. 2C, a touch screen 20c includes a loop coil 264, the display panel 251, the touch electrode layer 21, and the window 22.

In the case of the stylus pen 10 including the resonant circuit, when the loop coil 264 delivers the magnetic signal B to the stylus pen 10, the resonant circuit contained in the stylus pen 10 resonates with the magnetic signal B. Then, the electrode of the touch electrode layer 21 may be input with the resonant electromagnetic signal E and/or B from the stylus pen 10.

Compared to the digitizer 29, the loop coil 264 does not receive the magnetic signal B for detecting a touch location, so a wiring structure is simple to thin the touch screen 20c. As a result, it is possible to thin and down-size the electronic device 2. In addition, since the loop coil 264 may be formed at various positions in various sizes, the touch screen 20c may also be applied to the foldable/flexible electronic device 2.

The loop coil 264 may include a substrate at which the antenna loop is located and the magnetic field shielding sheet. The antenna loop may be made of a conductor material such as copper and silver. In addition to the substrate, the antenna loop may be located on the same layer as the touch electrode layer 21, and in this case, the antenna loop may be made of a conductor material showing high transmittance and low impedance, such as metal mesh, ITO, graphene, silver nanowire, etc. Further, the antenna loop may also be located under the window, and in this case, the substrate may not be included in the loop coil 264.

In the above description, the touch electrode layer 21 may include a plurality of first touch electrodes for detecting first-direction touch coordinates and a plurality of second touch electrodes for detecting second-direction touch coordinates. In FIG. 2, the touch electrode layer 21 is illustrated as one layer, but the first touch electrode and the second touch electrode may be located on different layers, respectively, and located to overlap each other and not located to overlap each other, and a separate layer may also be interposed between a first touch electrode and a second touch electrode and is not limited thereto.

Referring to FIG. 2D, a touch screen 20d includes the display panel 251, the touch electrode layer 21, and the window 22.

An active stylus pen 10' outputs the electromagnetic signal E and/or B by using a power supply (e.g., a battery (including a secondary battery) storing power and a capacitor such as an electric double layered capacitor (EDLC)) in the active stylus pen 10'. Then, the electrode of the touch electrode layer 21 may be input with the electromagnetic signal E and/or B output from the stylus pen 10'. When the electrode of the touch electrode layer 21 is formed by the metal mesh with the small resistance, it is possible to detect the magnetic signal from the stylus pen 10'. The active stylus pen 10' may include a circuit for outputting the electromagnetic signal E and/or B having a predetermined frequency using the power supply.

The touch screen 20d may receive the electromagnetic signal from the stylus pen 10' without delivering the magnetic signal to the stylus pen 10'. That is, the touch screen 20d does not require an additional unit or module for generating a signal for resonating the resonant circuit, so thinning and miniaturization of the touch screen 20d are possible, and the touch screen 20d has a merit even in power consumption and manufacturing cost.

Next, referring to FIG. 3, the electronic device 2 according to example embodiments will be described.

Figure 3:
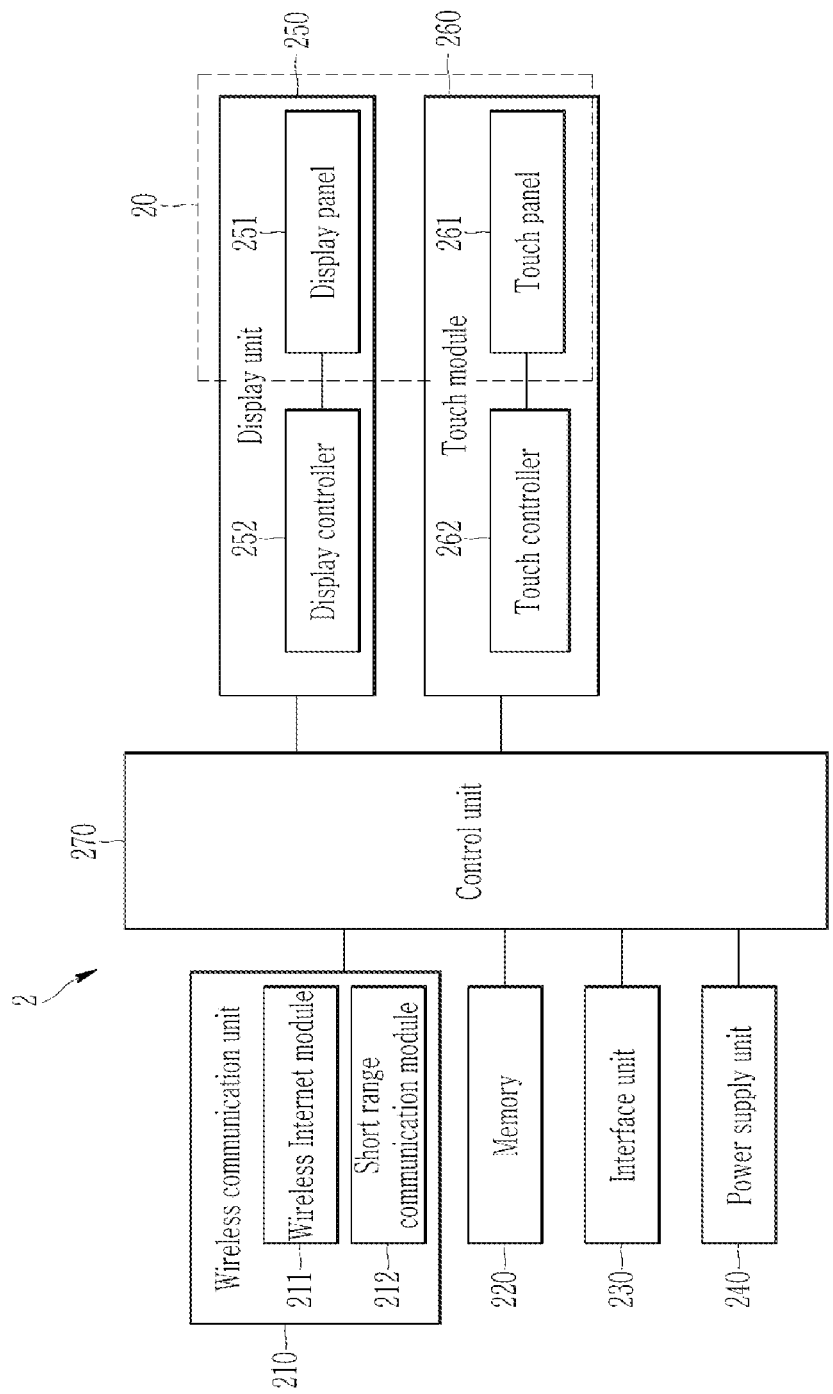
FIG. 3 is a block diagram schematically illustrating the electronic device.

FIG. 3 is a block diagram schematically illustrating the electronic device. As illustrated, the electronic device 2 may include a wireless communication unit 210, a memory 220, an interface unit 230, a power supply unit 240, a display unit 250, a touch module 260, and a control unit 270. Components illustrated in FIG. 3 are not required in implementing the electronic device and the electronic device described in the present disclosure may thus have components more or less than components listed above.

More specifically, among the components, the wireless communication unit 210 may include at least one module that enables wireless communication between the electronic device 2 and a wireless communication system, between the electronic device 2 and another electronic device 2, or between the electronic device 2 and an external server. In addition, the wireless communication unit 210 may include one or more modules that connect the electronic device 2 to one or more networks.

The wireless communication unit 210 may include a wireless Internet module 211 and a short range communication module 212.

The wireless Internet module 211 may refer to a module for wireless Internet access and may be embedded in the electronic device 2. The wireless Internet module may transmit and receive a wireless signal in a communication network in accordance with wireless Internet technologies. The wireless Internet technologies include, for example, Wireless LAN (WLAN), wireless-fidelity (Wi-Fi), Wireless Fidelity (Wi-Fi) direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), New Radio (NR), Long Term Evolution (LTE), Long Term Evolution-Advanced (LTE-A), etc., and the wireless Internet module 211 transmits and receives data according to at least one wireless Internet technology in a range including even Internet technologies not listed as above.

The short range communication module 212 which is used for short range communication may support the short range communication by using at least one of Bluetooth™, Radio Frequency Identification (RFID), Infrared Data Association (IrDA), Ultra Wideband (UWB), ZigBee, Near Field Communication (NFC), Wi-Fi, Wi-Fi Direct, and Wireless Universal Serial Bus (USB) technologies. Such a short range communication module 212 may support wireless communication between the electronic device 2 and the wireless communication system, between the electronic device 2 and a wireless communication device, or between the electronic device 2 and the network at which the external server is located through wireless area networks. The wireless area networks may be wireless personal area networks.

Here, the wireless communication device is a mobile terminal which is capable of exchanging data with (or interlocking with) the electronic device 2 according to the present disclosure, for example, the smart phone, the tablet PC, or the notebook. The short range communication module 212 may sense (or recognize) the wireless communication device which is capable of communicating with the electronic device 2 in the vicinity of the electronic device 2. Furthermore, when the sensed wireless communication device is a device certified to communicate with the electronic device 2 according to an example embodiment, the control unit 270 may transmit at least some of data processed by the electronic device 2 to the wireless communication device through the short range communication module 212. Therefore, a user of the wireless communication device may use the data processed by the electronic device 2 through the wireless communication device.

Further, the memory 220 stores data for supporting various functions of the electronic device 2. The memory 220 may store multiple application programs or applications drive by the electronic device 2, and data and instructions for the operation of the electronic device 2.

The interface unit 230 serves as a passage to various types of external devices connected to the electronic device 2. The interface unit 230 may include at least one of a wireless/wired headset port, an external charger port, a wired/wireless data port, a memory card port, a port connecting a device with an identification module, an audio input/output (I/O) port, a video input/output (I/O) port, and an earphone port.

The power supply unit 240 receives external power and internal power and supplies the power to each of the components included in the electronic device 2, under the control of the control unit 270. The power supply unit 240 may include a battery and the battery may become a built-in battery or a replaceable battery.

The display unit 250 displays (outputs) information processed by the electronic device 2. For example, the display unit 250 may display execution screen information of an application program driven by the electronic device 2 or user interface (UI) information and graphic user interface (GUI) information depending on the execution screen information.

The display unit 250 may include a liquid crystal display (LCD display), an organic light-emitting diode (OLED) display, an e-ink display, a quantum-dot light emitting display, and a micro light emitting diode (LED) display.

The display unit 250 includes a display panel 251 displaying the image and a display controller 252 connected to the display panel and supplying signals for displaying the image to the display panel 251. For example, a plurality of pixels connected to signal lines such as plurality of scan lines and plurality of data lines, and a scan driving/receiving unit supplying a scan signal through the scan line, and a display controller (display controller) 252 may be located in the display panel 251, and the display controller 252 may include a data driving IC that generates data signals applied through the data lines, a timing controller that controls the overall operation of the display unit 250 by processing an image signal, and a power management IC.

The touch module 260 senses a touch (or touch input) applied to a touch area using a capacitance scheme. As an example, the touch module 260 may be configured to convert a change of capacitance, voltage, or current generated in a specific site into an electrical input signal. The touch module 260 may be configured to detect a location and an area in which a touch object applies the touch onto the touch area, and a capacitance upon touch. Here, the touch object as an object that applies the touch to the touch sensor may be, for example, a body part (a finger, a palm, etc.) of the user or a passive or active scheme stylus pen 10.

The touch module 260 includes a touch sensor 261 at which the touch electrode is located, and a touch controller 262 which applies a driving signal to the touch sensor 261, receives a sensing signal from the touch sensor 261, and delivers touch data to the control unit 270 and/or the display controller 252.

The touch controller 262 may include a first driving/receiving unit connected to at least one of a plurality of first touch electrodes, and applying the driving signal and receiving the sensing signal, a second driving/receiving unit connected to at least one of a plurality of second touch electrodes, and applying the driving signal and receiving the sensing signal, and a micro control unit (MCU) controlling operations of the first driving/receiving unit and the second driving/receiving unit, and acquiring the touch location by using the sensing signals output from the first and second driving/receiving units.

The display panel 251 and the touch sensor 261 may be formed in a mutual layer structure or formed in an integrated form, which may be referred to as the touch screen 20.

The control unit 270 may control the driving of the electronic device 2, and output touch coordinate information in response to a touch sensing result of the electronic device 2. In addition, the control unit 270 may change a frequency of the driving signal in response to the touch sensing result.

The control unit 270 generally controls all operations of the electronic device 2 in addition to the operation related to the application program. The control unit 270 processes a signal, data, information, and the like input or output through the components or drives the application program stored in the memory 220 to provide or process information or a function appropriate for the user.

Further, the control unit 270 may control at least some of the components described jointly with FIG. 3 in order to drive the application program stored in the memory 220. Furthermore, the control unit 270 may mutually combine and operate at least two of the components included in the electronic device 2 in order to drive the application program.

Although it is described that the touch module 260 is included in the electronic device 2 with the display unit 250, the electronic device 2 may only include the touch module 260.

Figure 4:
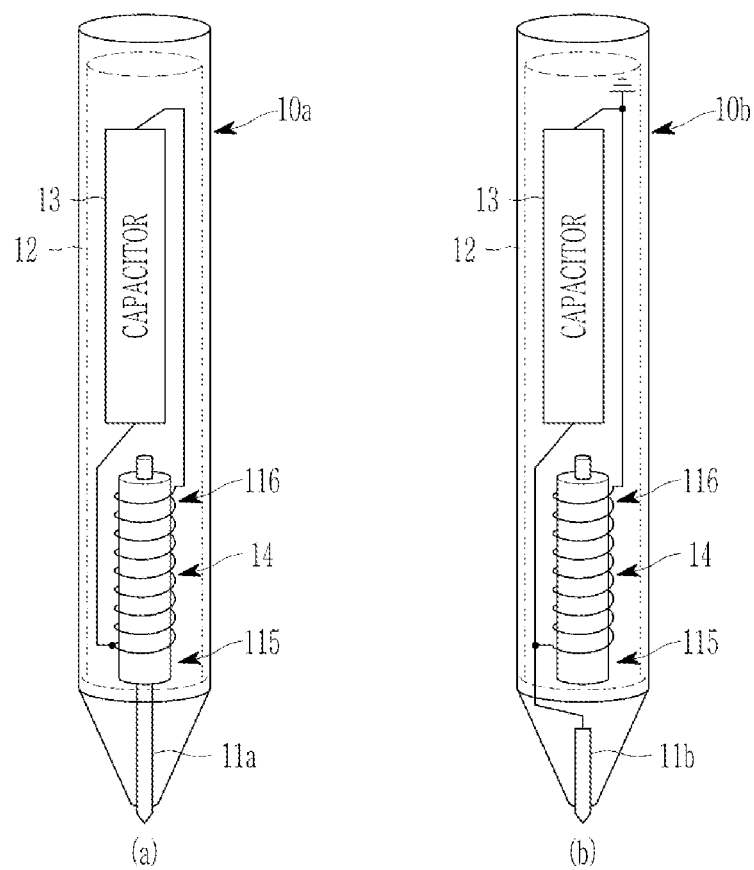
FIG. 4 is a diagram illustrating a stylus pen according to example embodiments.

FIG. 4 is a diagram illustrating a stylus pen according to example embodiments.

The stylus pen of FIG. 4 commonly includes a resonant circuit unit 12 in a housing.

The resonant circuit unit 12 as an LC resonant circuit may resonate with the driving signal output from the touch screen 20. The driving signal may include a signal (e.g., sine waves, spherical waves, etc.) having a frequency corresponding to a resonant frequency of the resonant circuit unit 12. For resonance, the resonant frequency of the resonant circuit unit 12 and the frequency of the driving signal should be the same or very similar. The resonant frequencies of the stylus pens 10a and 10b is according to design values of the resonant circuit units 12 of the stylus pens 10a and 10b. When the electrode layer 21 of the FIG. 2B or the loop coil 264 of the FIG. 2C generates the electromagnetic field by the driving signal, the resonant circuit units 12 of the stylus pens 10a and 10b resonate by using a signal received through a change of the magnetic field.

The elements of the stylus pens 10a and 10b may be accommodated in the housing. The housing may have a cylindrical pillar, polygonal pillar, a pillar form in which at least part is a curved surface, an entasis form, a frustum of pyramid form, and a circular truncated cone form, and is not limited the form. Since the housing is empty, the inside of the housing may accommodate the elements of the stylus pens 10a and 10b, such as the resonant circuit unit 12. The housing may be made of a non-conductive material.

As illustrated in FIG. 4A, the EMR-scheme stylus pen 10a includes a core body 11a and the resonant circuit unit 12. The resonant circuit unit 12 includes an inductor unit 14 and a capacitor unit 13. The inductor unit 14 includes a ferrite core 115 penetrated by the core body 11a and a coil 116 wound on the outer surface of the ferrite core 115.

One end portion of the core body 11a protrudes from the ferrite core 115, as the end of the pen. The core body 11a may be configured by an electrode core made of a conductor, for example, a hard resin that is incorporated with conductive metal or conductive powder, for example.

The ferrite core 115 has a shaft-direction through-hole having a predetermined diameter (e.g., 1 mm) for inserting and passing the core body 11a into a cylindrical ferrite material, for example. Besides, the ferrite core 115 may be formed in the form of the cylindrical pillar, the polygonal pillar, the pillar form in which at least part is the curved surface, the entasis form, the frustum of pyramid form, and the circular truncated cone form, a toroid, or a ring form.

The coil 116 may be wound across the entire axis-direction length of the ferrite core 115 or may be wound over a partial length. The coil 116 is electrically connected to the capacitor unit 13.

The capacitor unit 13 may include a plurality of capacitors connected in parallel. Each capacitor on the PCB may have different capacitance from each other and may be trimmed within a manufacturing process.

As illustrated in FIG. 4B, the ECR-scheme stylus pen 10b includes a tip 11b and the resonant circuit unit 12. The resonant circuit unit 12 includes an inductor unit 14 and a capacitor unit 13. The inductor unit 14 includes the ferrite core 115 and a coil 116 wound on the outer surface of the ferrite core 115.

At least a part of a tip 11*b* may be made of a conductive material (e.g., a metal, a conductive rubber, a conductive fabric, a conductive silicone, etc.), and is not limited thereto.

The coil 116 may be wound across the entire shaft-direction length of the ferrite core 115 or may be wound over a partial length. The coil 116 is electrically connected to the capacitor unit 13.

The capacitor unit 13 may include a plurality of capacitors connected in parallel. Each capacitor on the PCB may have different capacitance from each other and may be trimmed within a manufacturing process.

Figure 5:
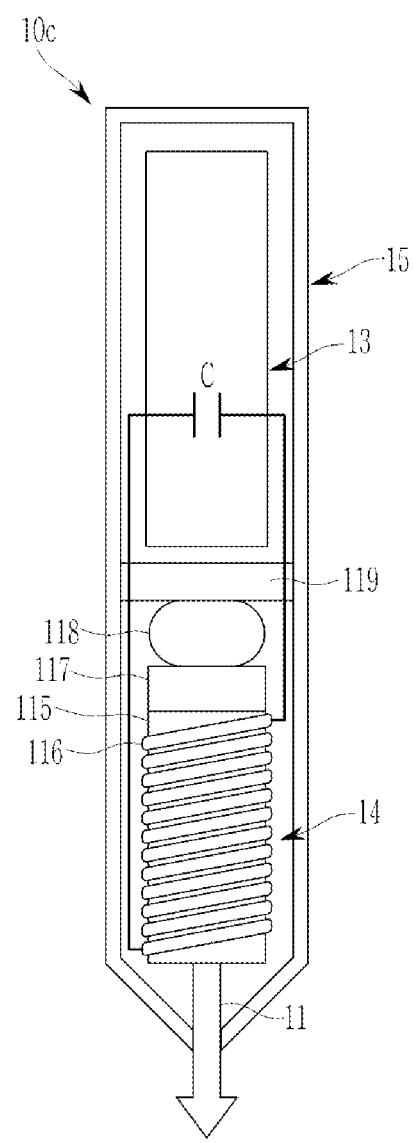
FIG. 5 schematically illustrates a stylus pen according to a first example embodiment.

FIG. 5 schematically illustrates a stylus pen according to a first example embodiment.

Referring to FIG. 5, the resonant circuit unit 12 of the stylus pen 10*c* may include the capacitor unit 13 and the inductor unit 14. The inductor unit 14 may include the ferrite core 115 and the coil 116 wound on the ferrite core 115. The inductor unit 14 may further include a magnetic body 117.

In the ferrite core 115, a through-hole may be formed in the shaft direction (not illustrated) (the Z-axis direction of FIG. 5). The through-hole may be formed to be inserted and passed with the core body 11, and the core body 11 may be inserted into the through-hole. Therefore, when replacement of the core body 11 is needed, only the core body 11 may be separated from the ferrite core 115 and replaced, so there is a merit that replacement is easy.

An end portion of the core body 11 may serve as a pen tip of the stylus pen 10*c*. One end portion of the core body 11 serving as the pen tip may be exposed to the outside of the ferrite core 115 through an opening of the through-hole formed on one surface of the ferrite core 115. The core body 11 may move along the through-hole of the ferrite core 115, that is, in the Z-axis direction, when shaft-direction pressure is applied to one end portion of the core body 11 serving as the pen tip. In contrast, the location of the ferrite core 115 may be fixed inside the housing 15 of the stylus pen 10*c*. That is, the ferrite core 115 may be fixed to a specific location in the housing 15, regardless of the pen pressure applied to the core body 11. In the example embodiment, the ferrite core 115 and the coil 116 are fixed under the magnetic body 117, that is, closer to the pen tip portion of the core body 11 to enhance performance and secure mass production.

The magnetic body 117 may be coupled to the other end portion of the core body 11. The other end portion of the core body 11 may be in contact with the magnetic body 117 through the opening of the through-hole formed on the other surface of the ferrite core 115. The magnetic body 117 may move in the Z-axis direction with the movement of the core body 11 when the core body 11 moves in the Z-axis direction.

A fixation member 119 may be located inside the housing 15. The fixation member 119 may be fixed inside the housing 15 to limit the amount of displacement of the core body 11 and the magnetic body 117. An elastic member 118 may be located between the fixation member 119 and the magnetic body 117. The elastic member 118 may be supported by the fixation member 119. When the pressure in the Z-axis direction is applied to the core body 11 and the magnetic body 117 is moved to the fixation member 119, the elastic member 118 may be compressed in the Z-axis direction. If there is no pressure in the Z-axis direction applied to the core body 11, or if the pressure in the z-axis direction applied to the core body 11 is smaller than the elastic force of the elastic member 118, the magnetic body 117 and the core body 11 may be moved to an initial position by the elastic force of the elastic member 118 or may maintain the initial position. The elastic member 118 may be made of materials having the elastic force, such as spring and elastic rubber.

When the core body 11 moves in the Z-axis direction, the magnetic body 117 moves in the Z-axis direction in link with the movement of the core body 11, so the core body 11 may be spaced apart from the ferrite core 115. Thus, the relative position between the ferrite core 115 and the magnetic body 117 may be variable.

Figure 6:
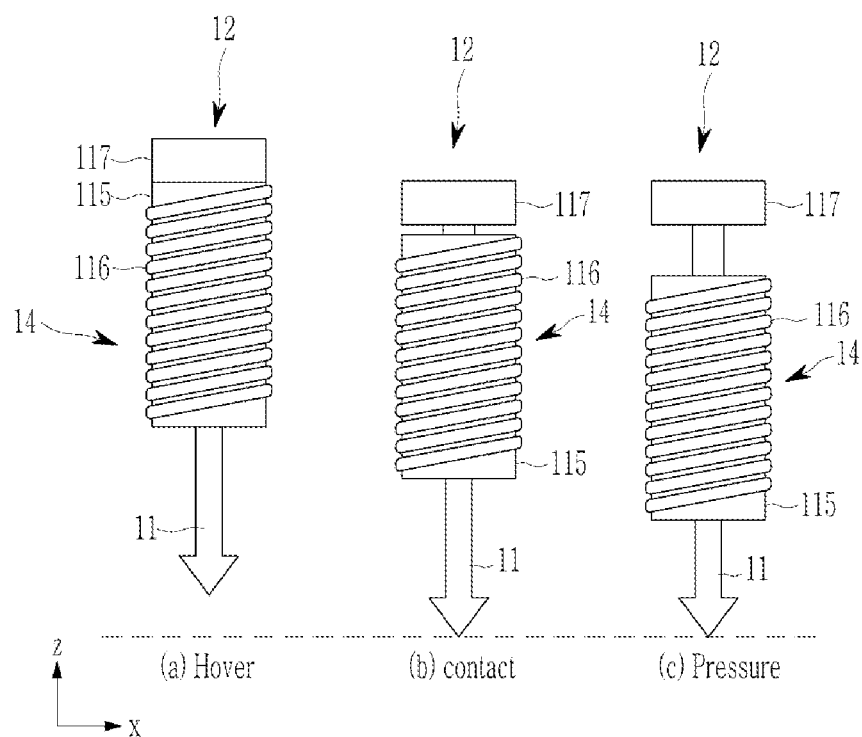
FIG. 6 is a diagram for describing an operation according to pen pressure of the stylus pen according to the first example embodiment.

FIG. 6 is a diagram for describing an operation according to pen pressure of the stylus pen of FIG. 5.

Referring to FIG. 6A, when the core body 11 is not in contact with the touch screen (see reference numeral 20 of FIG. 3), the core body 11, and the magnetic body 117 may maintain the initial position without movement. Accordingly, the ferrite core 115 and the magnetic body 117 may be in contact with each other or maintain a very close distance.

Referring to FIG. 6B, when one end portion of the core body 11 contacts the touch screen 20 ('contact' state), the core body 11 and the magnetic body 117 may move in the Z-axis direction by the pressure applied to the core body 11. In this case, since the ferrite core 115 maintains a fixed position in the housing 15 regardless of the pen pressure, the ferrite core 115 and the magnetic body 117 are separated from each other, or a spacing distance between the ferrite core 115 and the magnetic body 117 may be increased.

Referring to FIG. 6C, when the pen pressure is gradually increased ('pressure' state) after one end portion of the core body 11 is in contact with the touch screen 20, the core body 11 and the magnetic body 117 may be additionally moved in the Z-axis direction according to the pen pressure applied to the core body 11. That is, the core body 11 and the magnetic body 117 may move further in the Z-axis direction as the pen pressure increases. Thus, the spacing distance between the ferrite core 115 and the magnetic body 117 may also be increased as the pen pressure increases.

The magnetic body 117 may be made of materials having the same or different magnetic permeabilities. As an example, the magnetic body 117 may be made of a ferrite having the same magnetic permeability as the ferrite core 115. The magnetic body 117 may affect the inductance of the coil 116, and the relative position change between the ferrite core 115 and the magnetic body 117 changes the change in the magnetic flux density, which may change the inductance of the resonant circuit unit 12.

Figure 7:
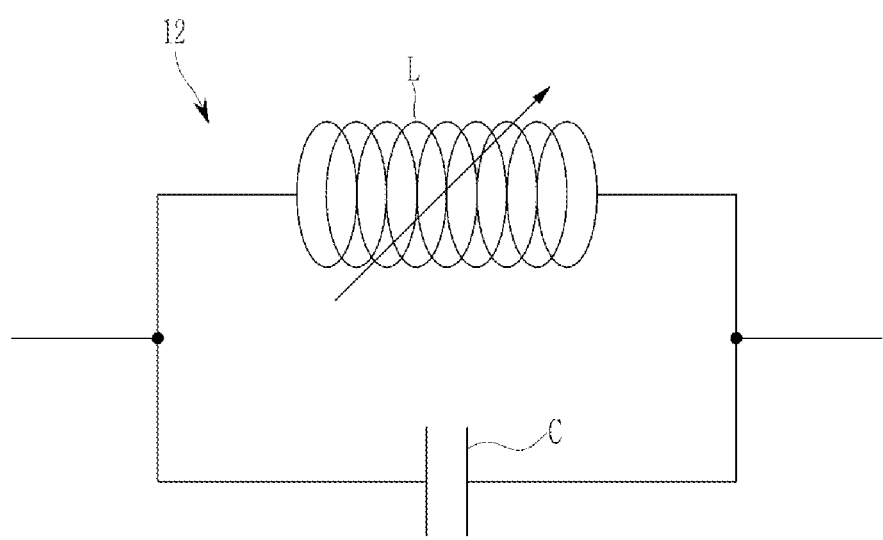
FIG. 7 is a diagram schematically illustrating an equivalent circuit of a resonant circuit unit of the stylus pen according to the first example embodiment.

FIG. 7 is a diagram schematically illustrating an equivalent circuit of a resonant circuit unit of the stylus pen of FIG. 5. Referring to both FIGS. 5 and 7, when the magnetic body 117 moves according to the pen pressure, an inductance L of the inductor unit 14 may be variable according to the pen pressure. An inductance value of the variable inductance L may gradually decrease as the spacing distance between the ferrite core 115 and the magnetic body 117 increases. In other words, as the pen pressure applied to the core body 11 increases, the inductance value of the resonant circuit unit 12 may gradually decrease as the spacing distance between the ferrite core 115 and the magnetic body 117 increases.

When the inductance L of the inductor unit 14 is changed, the resonant frequency of the resonant circuit unit 12 is changed. Therefore, in the example embodiment, when the pen pressure is applied to the stylus pen 10*c*, the resonant frequency of the resonant circuit unit 12 may be changed due to the change of the inductance. When the resonant frequency of the resonant circuit unit 12 is changed, a phase of the electromagnetic signal that is output in response to the driving signal of the touch screen (see reference numeral 20 of FIG. 3) in the stylus pen 10c is changed. Then, the touch controller (see reference numeral 262 of FIG. 3) may detect the pen pressure by calculating an inductance change amount of the resonant circuit unit 12 from the changed phase of the electromagnetic signal output from the stylus pen 10c.

Figure 8:
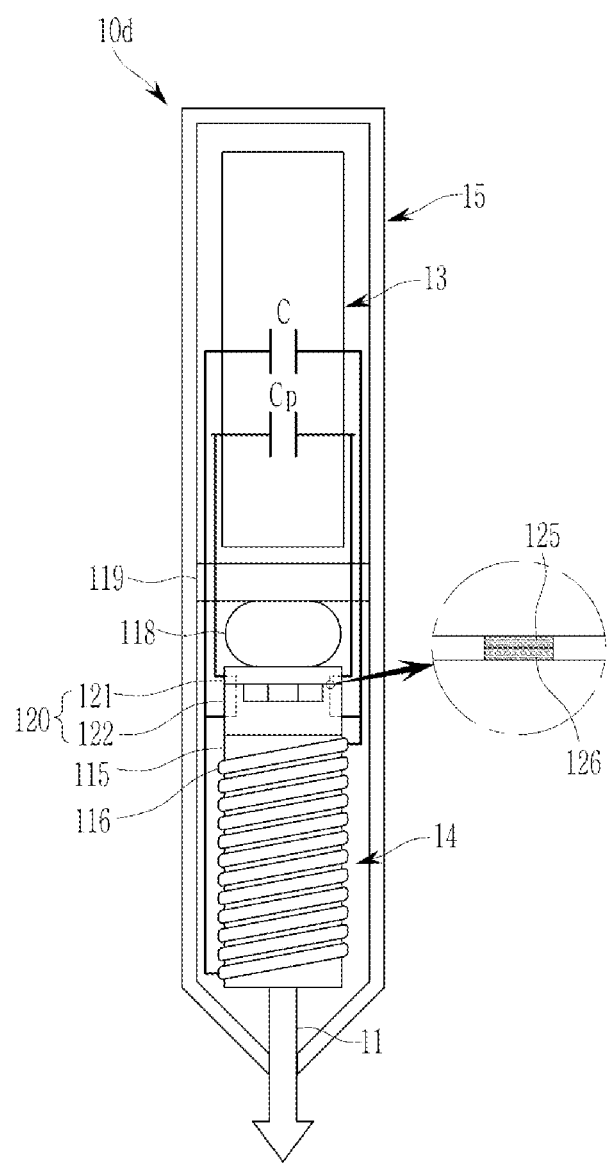
FIG. 8 schematically illustrates a stylus pen according to a second example embodiment.

FIG. 8 schematically illustrates a stylus pen according to a second example embodiment.

Referring to FIG. 8, the resonant circuit unit (see reference numeral 12 of FIG. 4) of the stylus pen 10d may include the capacitor unit 13 and the inductor unit 14. The capacitor unit 13 may include one or more resonant capacitors C electrically connected to the coil 116 of the inductor unit 14. The capacitor unit 13 may further include an additional capacitor $C_P$ optionally connected to the coil 116 and connected to the resonant capacitor C when connected to the coil 116.

The through-hole formed to insert and pass the core body 11 may be formed in the ferrite core 115 in the shaft direction (the Z-axis direction of FIG. 8), and the core body 11 may be inserted into the through-hole. The location of the ferrite core 115 may be fixed inside the housing 15 of the stylus pen 10d. In the example embodiment, the ferrite core 115 and the coil 116 are fixed under the switching member 120, that is, close to the pen tip portion of the core body 11, which enhances the performance and secures the mass production.

One end portion of the core body 11 may serve as the pen tip of the stylus pen 10d. One end portion of the core body 11 serving as the pen tip may be exposed to the outside of the ferrite core 115 through the opening of the through-hole formed on one surface of the ferrite core 115. When the shaft-direction pressure is applied to one end portion of the core body 11 serving as the pen tip, the core body 11 may move along the through-hole of the ferrite core 115 (i.e., the Z-axis direction).

The stylus pen 10d may further include the switching member 120 including a movable part 121 and a fixation part 122. The movable part 121 may be coupled to the other end portion of the core body 11. The other end portion of the core body 11 may be in contact with the movable part 121 by passing through the opening of the through-hole formed on the other surface of the ferrite core 115. When the movable part 121 moves in the Z-axis direction, the movable part 121 may move in the Z-axis direction with the movement of the core body 11. The fixation part 122 may be located between the ferrite core 115 and the movable part 121 and may maintain a fixed position. As an example, the location of the fixation part 122 may be fixed at an end portion of the ferrite core 115 facing the movable part 121. In the switching member 120 of such a structure, the movable part 121 may be in contact with the fixation part 122 according to the movement of the core body 11 or may be spaced apart from the fixation part 122.

A fixation member 119 for limiting the displacement amount of the core body 11 and the movable part 121 may be located between the capacitor unit 13 and the inductor unit 14 inside the housing 15. An elastic member 118 may be located between the fixation member 119 and the magnetic body 117. The elasticity member 118 may be supported by the fixation member 119. When the pressure in the Z-axis direction is applied to the core body 11 and the magnetic body 121 is moved to the fixation member 119, the elastic member 118 may be compressed in the Z-axis direction. If there is no pressure in the Z-axis direction applied to the core body 11, or if the pressure in the z-axis direction applied to the core body 11 is smaller than the elastic force of the elastic member 118, the movable part 121 and the core body 11 may be moved to an initial position by the elastic force of the elastic member 118 or may maintain the initial position.

Figure 9:
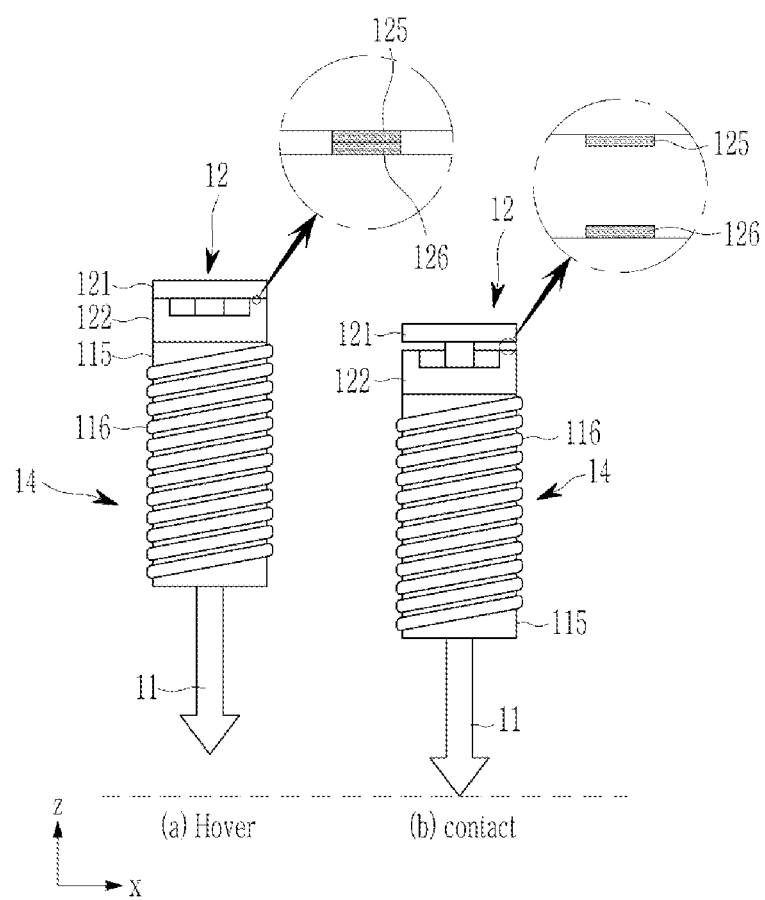
FIG. 9 is a diagram for describing an operation according to the pen pressure of the stylus pen according to the second example embodiment.

FIG. 9 is a diagram for describing an operation according to pen pressure of the stylus pen of FIG. 8.

Referring to FIG. 9A, in a state in which the core body 11 is not in contact with the touch screen 20 ('HOVER' state), there is no pressure applied to the Z-axis direction to the core body 11, and the core body 11 and the movable part 121 may maintain the initial position without movement. Accordingly, the movable part 121 may maintain a state of contacting the fixation part 122.

Referring to FIG. 9B, when one end portion of the core body 11 contacts the touch screen 20 ('contact' state), the core body 11 and the movable part 121 may move in the Z-axis direction by the pressure applied to the core body 11 upon the contact. Accordingly, the movable part 121 may be spaced apart from the fixation part 122.

Each of the movable part 121 and the fixation part 122 may include substrates and one or more conductive contacts 125 and 126 formed on the substrates, respectively. The movable part 121 may include one or more conductive contacts 125 electrically connected to the additional capacitor $C_P$. The fixation part 122 may include one or more contacts 126 that are electrically connected to the coil 116. The contacts 125 and 126 may be formed opposite to each other on surfaces facing each other on the substrate of the movable part 121 and the substrate of the fixation part 122. Therefore, the contacts 125 and 126 are in contact or apart from each other according to the contact state of the movable part 121 and the fixation part 122 and operate to switch the electrical connection between the additional capacitor $C_P$ and the coil 116.

Figure 10:
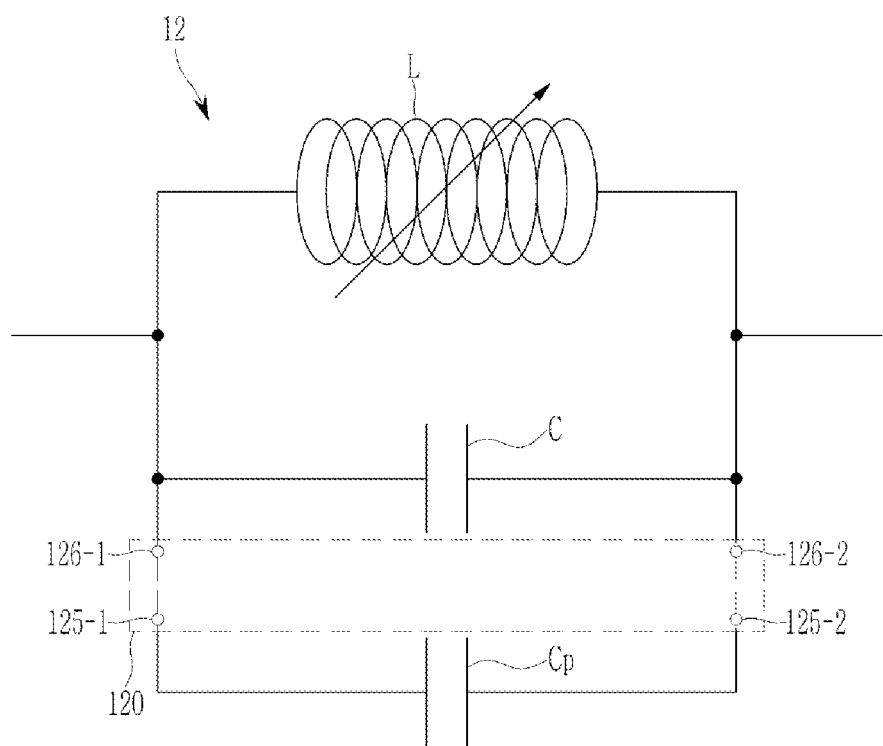
FIG. 10 is a diagram schematically illustrating the equivalent circuit of the resonant circuit unit of the stylus pen according to the second example embodiment.

FIG. 10 is a diagram schematically illustrating an equivalent circuit of a resonant circuit unit of the stylus pen of FIG. 8. By taking FIG. 10 as an example, contacts 125-1 and 125-2 of the movable part 121 are connected to both ends of the additional capacitor $C_P$, and the contacts 126-1 and 126-2 of the fixation part 122 are connected to both ends of the coil 116, respectively. Accordingly, when the movable part 121 and the fixation part 122 are in contact with each other, the contact 125-1 and the contact 126-1 are in contact with each other, and the contact 125-2 and the contact 126-2 are in contact with each other, so the additional capacitor $C_P$ may be connected in parallel to the coil 116 jointly with the resonant capacitor C. On the other hand, when the movable part 121 and the fixation part 122 are spaced apart from each other, and the electrical connection between the contact 125-1 and the contact 126-1, and the contact 125-2 and the contact 126-2 is thus released, the additional capacitor $C_P$ is separated from the resonant capacitor C and the coil 116, and as a result, the capacitance of the resonant circuit unit 12 may be reduced.

When the capacitance of the resonant circuit unit 12 is changed, the resonant frequency of the resonant circuit unit 12 is changed. Therefore, in the example embodiment, the resonant frequency of the resonant circuit unit 12 may be changed due to the connection release of the additional capacitor $C_P$ when the stylus pen 10d contacts the touch screen 20. When the resonant frequency of the resonant circuit unit 12 is changed, a phase of the electromagnetic signal that is output in response to the driving signal of the touch screen (see reference numeral 20 of FIG. 3) in the stylus pen 10d is changed. Then, the touch controller (see reference numeral 262 of FIG. 3) may detect the contact with the touch screen 20 by sensing the change in capacitance of the resonant circuit unit 12 from the changed phase of the electromagnetic signal output from the stylus pen 10*d*.

Figure 11:
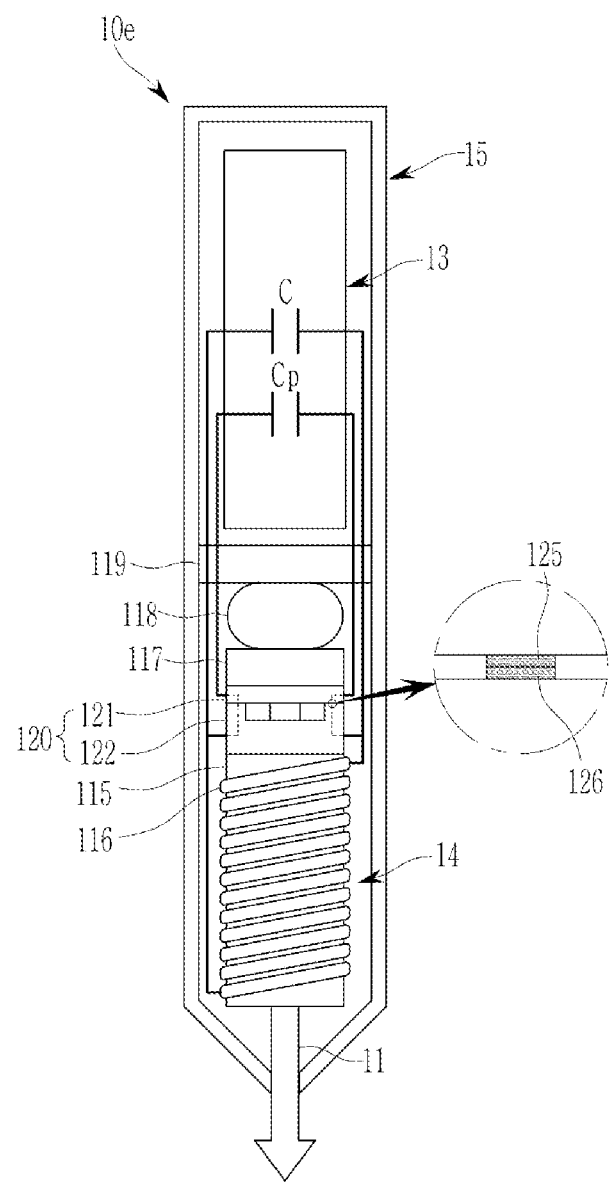
FIG. 11 schematically illustrates a stylus pen according to a third example embodiment.

FIG. 11 schematically illustrates a stylus pen according to a third example embodiment.

Referring to FIG. 11, the resonant circuit unit (see reference numeral 12 of FIG. 4) of the stylus pen 10*e* may include the capacitor unit 13 and the inductor unit 14. The inductor unit 14 may include the ferrite core 115 and the coil 116 wound on the ferrite core 115, and further include the magnetic body 117. The capacitor unit 13 may include one or more resonant capacitors C and may further include the additional capacitor $C_P$.

The through-hole formed to insert and pass the core body 11 may be formed in the ferrite core 115 in the shaft direction (the Z-axis direction of FIG. 11), and the core body 11 may be inserted into the through-hole. The location of the ferrite core 115 may be fixed inside the housing 15 of the stylus pen 10*e*. In the example embodiment, the ferrite core 115 and the coil 116 are fixed under the magnetic body 117 and the switching member 120, that is, closer to the pen tip portion of the core body 11 to secure the mass production.

One end portion of the core body 11 may serve as the pen tip of the stylus pen 10*e*. One end portion of the core body 11 serving as the pen tip may be exposed to the outside of the ferrite core 115 through an opening of the through-hole formed on one surface of the ferrite core 115. When the shaft-direction pressure is applied to one end portion serving as the pen tip, the core body 11 may move along the through-hole of the ferrite core 115 (i.e., the Z-axis direction).

The magnetic body 117 may be coupled to the other end portion of the core body 11. When the core body 11 moves in the Z-axis direction, the magnetic body 117 may move in the Z-axis direction with the movement of the core body 11.

The stylus pen 10*e* may further include the switching member 120 including a movable part 121 and a fixation part 122. The movable part 121 may be coupled to the other end portion of the core body 11, and located between the magnetic body 117 and the ferrite core 115. The other end portion of the core body 11 may be in contact with the movable part 121 by passing through the opening of the through-hole formed on the other surface of the ferrite core 115. The movable part 121 may be move in a shaft direction (the Z-axis direction of FIG. 11) with the movement of the core body 11 jointly with the magnetic body 117. The fixation part 122 may be located between the ferrite core 115 and the movable part 121 and may maintain a fixed position. As an example, the fixation part 122 may be coupled to an end portion of the ferrite core 115, which faces the movable part 121. In the switching member 120 of such a structure, the movable part 121 may be in contact with the fixation part 122 according to the movement of the core body 11 or may be spaced apart from the fixation part 122.

A fixation member 119 for limiting the displacement amount of the core body 11 and the movable part 121 may be located between the capacitor unit 13 and the inductor unit 14 inside the housing 15. An elastic member 118 may be located between the fixation member 119 and the magnetic body 117. If there is no pressure in the Z-axis direction applied to the core body 11, or if the pressure in the z-axis direction applied to the core body 11 is smaller than the elastic force of the elastic member 118, the elastic member 118 may perform a function to restore the core body 11, the magnetic body 117, and the movable part 121 to the initial position.

Figure 12:
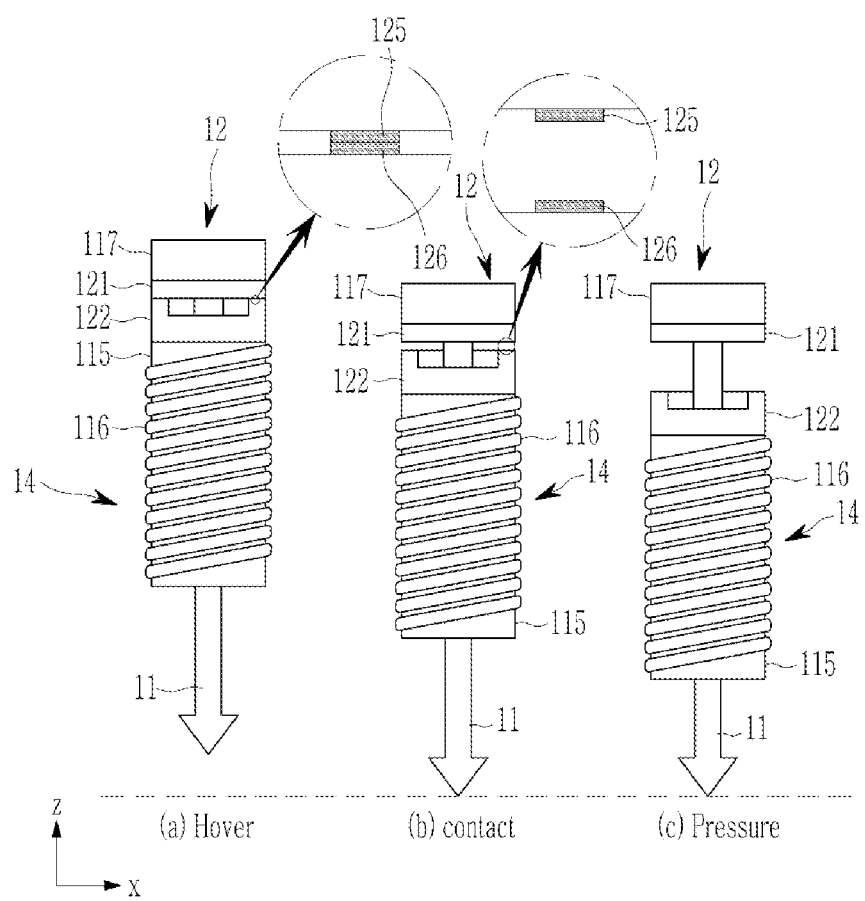
FIG. 12 is a diagram for describing the operation according to the pen pressure of the stylus pen according to the third example embodiment.

FIG. 12 is a diagram for describing an operation according to pen pressure of the stylus pen of FIG. 11.

Referring to FIG. 12A, in a state in which the core body 11 is not in contact with the touch screen 20 ('HOVER' state), there is no pressure applied to the Z-axis direction to the core body 11, and the core body 11 may maintain the initial position without movement. Therefore, the movable part 121 and the magnetic body 117 may also maintain the initial position without movement. In the initial position, the movable part 121 is in contact with the fixation part 122, and the ferrite core 115 and the magnetic body 117 may maintain a very close spacing distance (corresponding to heights in the Z-axis directions of the movable part 121 and the fixation part 122) to each other.

Referring to FIG. 12B, when one end portion of the core body 11 contacts the touch screen 20 ('contact' state), the core body 11 may move in the Z-axis direction by the pressure applied to the core body 11. Accordingly, the movable part 121 is spaced apart from the fixation part 122, and the spacing distance between the magnetic body 117 and the ferrite core 115 may also increase by the movement distance of the core body 11.

Referring to FIG. 12C, when the pen pressure is gradually increased ('pressure' state) after one end portion of the core body 11 is in contact with the touch screen 20, the core body 11 may be additionally moved in the Z-axis direction according to the pen pressure. Accordingly, the movable part 121 and the magnetic body 117 also additionally move in the Z-axis direction by the movement distance of the core body 11, and the spacing distance between the magnetic body 117 and the ferrite core 115 may also additionally increase.

Each of the movable part 121 and the fixation part 122 may include substrates and one or more contacts 125 and 126 formed on the substrates, respectively. The movable part 121 may include one or more contacts 125 electrically connected to the additional capacitor Cp. The fixation part 122 may include one or more contacts 126 that are electrically connected to the coil 116. The contacts 125 and 126 may be formed opposite to each other on surfaces facing each other on the substrate of the movable part 121 and the substrate of the fixation part 122. Therefore, the contacts 125 and 126 may be in contact with or spaced apart from each other according to the contact state of the movable part 121 and the fixation part 122 and may operate to switch the electrical connection between the additional capacitor $C_P$ and the coil 116.

Figure 13:
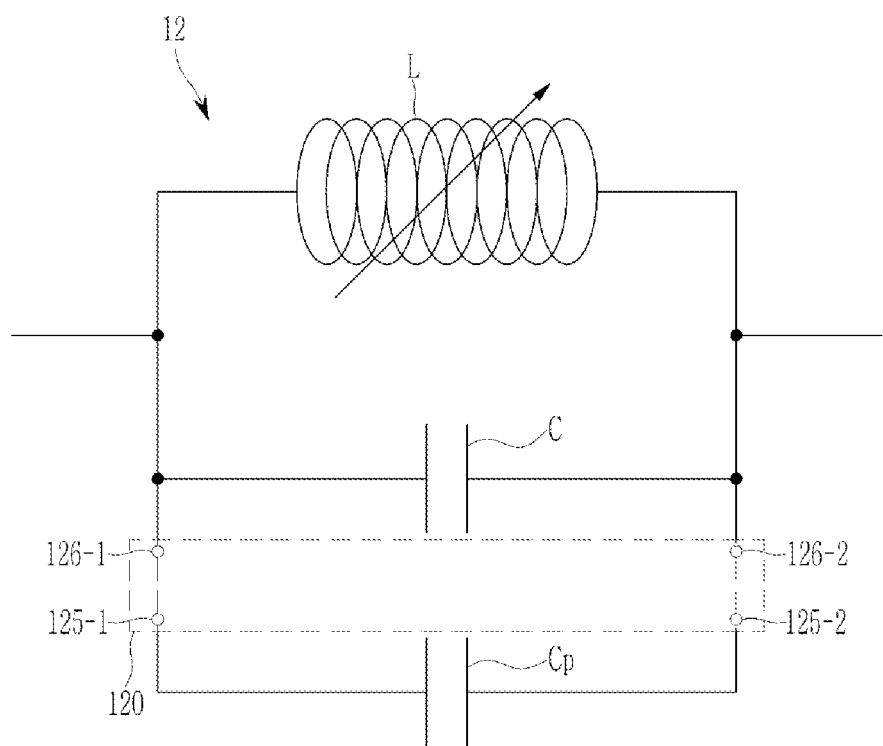
FIG. 13 is a diagram schematically illustrating the equivalent circuit of the resonant circuit unit of the stylus pen according to the third example embodiment.
Figure 14:
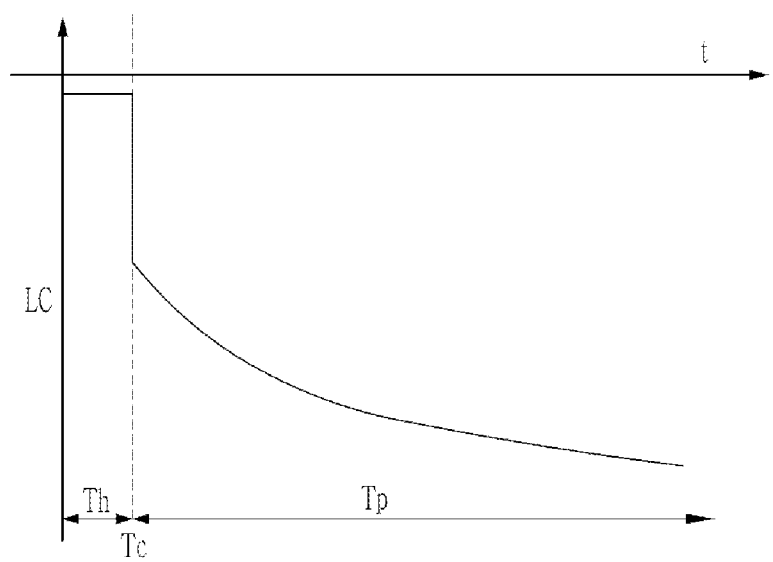
FIG. 14 is a graph illustrating a change in LC value according to the pen pressure of the stylus pen according to the third example embodiment.
Figure 15:
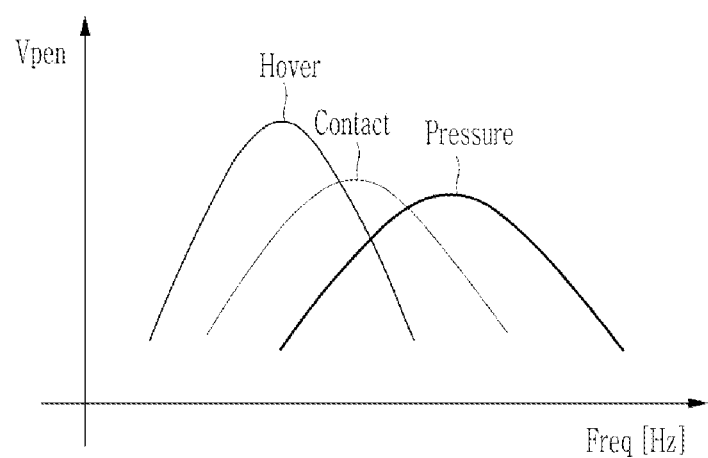
FIG. 15 is a graph illustrating a frequency response characteristic of the stylus pen according to the third example embodiment.

FIG. 13 is a diagram schematically illustrating an equivalent circuit of a resonance circuit unit of the stylus pen of FIG. 11. Further, FIG. 14 is a graph illustrating a change in LC value according to the pen pressure of the stylus pen of FIG. 11. FIG. 15 is a graph illustrating a frequency response characteristic of the stylus pen of FIG. 11.

By taking FIG. 13 as an example, contacts 125-1 and 125-2 of the movable part 121 are connected to both ends of the additional capacitor $C_P$, and the contacts 126-1 and 126-2 of the fixation part 122 are connected to both ends of the coil 116, respectively. Accordingly, when the movable part 121 and the fixation part 122 are in contact with each other, the contact 125-1 and the contact 126-1 are in contact with each other, and the contact 125-2 and the contact 126-2 are in contact with each other, so the additional capacitor $C_P$ may be connected in parallel to the coil 116 jointly with the resonant capacitor C. On the other hand, when the movable part 121 and the fixation part 122 are spaced apart from each other, and the electrical connection between the contact 125-1 and the contact 126-1, and the contact 125-2 and the contact 126-2 is thus released, the additional capacitor $C_P$ is separated from the resonant capacitor C and the coil 116, and as a result, the capacitance of the resonant circuit unit 12 may be reduced.

In addition, a distance change between the ferrite core 115 and the magnetic body 117 may vary the inductance of the resonant circuit unit 12. Thus, the resonant circuit unit 12 may include an inductor unit 14 in which the inductance value is variable according to the pen pressure, as illustrated in FIG. 13. The inductance value of the inductor unit 14 may gradually decrease as the spacing distance between the ferrite core 115 and the magnetic body 117 increases.

Accordingly, the LC value of the resonant circuit unit 12 may gradually decrease as the pressure applied to the core body 11 increases. FIG. 14 illustrates a change in the LC value according to the change of the pen pressure as an example, and a Th section indicates a section in which the core body 11 of the stylus pen 10e is not in contact with the touch screen 20 ('HOVER' state in FIG. 12), a Tc point indicates immediately after the core body 11 of the stylus pen 10e contacts the touch screen 20 ('Contact' state in FIG. 12), and a Tp section indicates a section in which the pen pressure applied to the stylus pen 10e gradually increases ('pressure' state in FIG. 12). Referring to FIG. 14, the LC value of the resonant circuit unit 12 maintains a predetermined value until the core body 11 of the stylus pen 10e is in contact with the touch screen 20, and rapidly decreases immediately after the core body 11 is in contact with the touch screen 20, and the movable part 121 and the fixation part 122 are thus spaced apart from each other. In addition, after the stylus pen 10e contacts the touch screen 20, the LC value of the resonance circuit unit 12 may further decrease according to the pen pressure in the section Tp in which the pen pressure is applied to the stylus pen 10e. That is, in this section Tp, as the pen pressure applied the stylus pen 10e increases, the LC value of the resonant circuit unit 12 may gradually decrease. Referring to FIG. 14, the LC value of the resonant circuit unit 12 appears as the 'HOVER' state>'Contact' state>'pressure' state. In addition, immediately after the core body 11 contacts the touch screen 20, a larger amount of change in the LC value appears in a state in which the pen pressure subsequently gradually increases.

When the inductance and the capacitance of the resonant circuit unit 12 are changed, the resonant frequency and a Q value of the resonant circuit unit 12 may also be changed. The resonant frequency of the resonant circuit unit 12 may increase as the inductance of the resonant circuit unit 12 decreases, and the Q value may decrease as the inductance decreases. Therefore, as illustrated in FIG. 15, in regard to the frequency characteristics of a resonant signal Vpen, which are output from the resonant circuit unit 12 according to the example embodiment, the larger the movement distance of the core body 11, that is, the higher the pen pressure increases, the resonant frequency increases ('HOVER' state<'Contact' state<'press' state) and the Q value may decrease ('HOVER' state>'Contact' state>'press' state).

When the resonant frequency of the resonant circuit unit 12 is changed, a phase of the electromagnetic signal that is output in response to the driving signal of the touch screen (see reference numeral 20 of FIG. 3) in the stylus pen 10e is changed. Then, the touch controller (see reference numeral 262 of FIG. 3) may calculate the change in LC Value of the resonant circuit unit 12 from the changed phase of the electromagnetic signal output from the stylus pen 10e and detect whether the stylus pen 10e contacts the touch screen 20 and the pen pressure of the stylus pen 10e based on the calculated LC value change.

As described above, the stylus pen according to the example embodiments changes at least one of the inductance and the capacitance of the resonant circuit unit 12 using a simple structure, so that there is a merit that the manufacturing cost of the stylus pen capable of detecting the pen pressure can be lowered. In addition, there is a merit of being capable of measuring precise pen pressure by the stylus pen.

On the other hand, in the manufacturing process of the stylus pen according to the example embodiments, a soldering process may further occur in the process of configuring the circuit for detecting whether the touch is made and the pen pressure. However, as the soldering work increases, the manufacturing process becomes more complicated, and the manufacturing cost may increase, and the possibility of a failure caused by poor soldering is also increased. Therefore, it is necessary to minimize the soldering connection in the process of implementing a pen pressure detection function of the stylus pen.

Hereinafter, example embodiments of the stylus pen 10 to reduce the complexity of an assembly process by minimizing the soldering connection will be described with reference to FIGS. 16 to 21. FIGS. 16 to 21 illustrate example embodiments modified from the stylus pen 10e according to the third example embodiment described with reference to FIGS. 11 to 13. In FIGS. 16 to 21, the same reference numeral is used for the same components as the stylus pen 10e according to the third example embodiment, and the redundant description is omitted.

Figure 16:
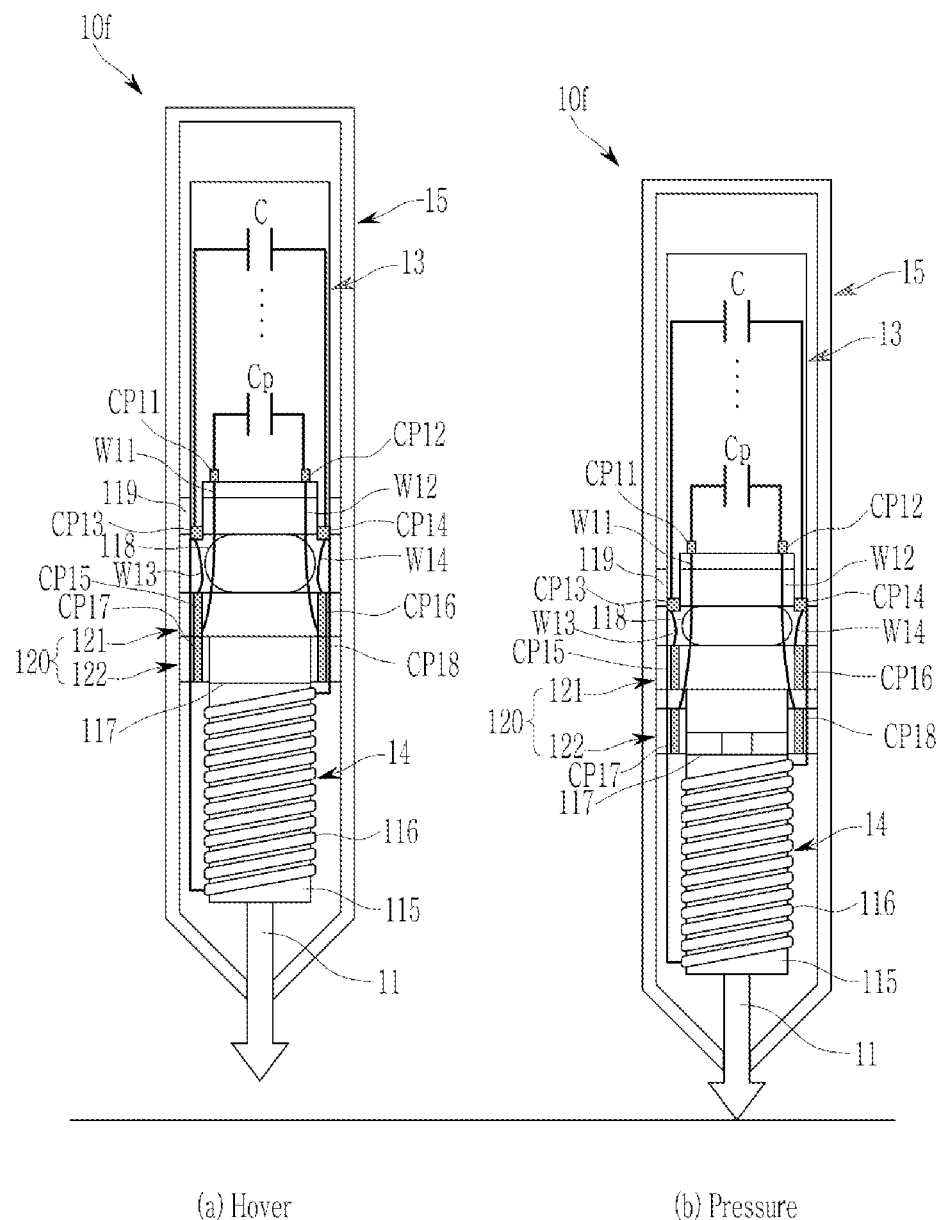
FIG. 16 schematically illustrates a stylus pen 10f according to a fourth example embodiment.

FIG. 16 schematically illustrates a stylus pen 10f according to a fourth example embodiment.

Referring to FIG. 16, in the stylus pen 10f according to the fourth example embodiment, one end portion of the core body 11 may serve as the pen tip, and the magnetic body 117 may be located at the other end portion of the core body 11. When the core body 11 moves in the Z-axis direction by the pen pressure, the magnetic body 117 may move in the Z-axis direction with the movement of the core body 11.

The stylus pen 10f may further include the switching member 120 including a movable part 121 and a fixation part 122.

The movable part 121 may be positioned to contact the magnetic body 117 or structurally coupled to the magnetic body 117. In this case, the movable part 121 may be located between the elastic member 118 and the magnetic body 117. The movable part 121 may be installed to be movable in the Z-axis direction from the inside of the housing 15. When the core body 11 and the magnetic body 117 move to the elastic member 118 by the pen pressure, the movable part 121 may also move to the elastic member 118 to press the elastic member 118. If there is no pressure in the Z-axis direction applied to the core body 11, or if the pressure in the z-axis direction applied to the core body 11 is smaller than the elastic force of the elastic member 118, the movable part 121 may be moved to the initial position jointly with the magnetic body 117 and the core body 11 by the elastic force of the elastic member 118 or may maintain the initial position.

The fixation part 122 may be installed to maintain a fixed position (e.g., a position between the ferrite core 115 and the movable part 121) inside the housing 15. The fixation part 122 may include a through-hole formed in the Z-axis direction at the center of the fixation part 122. The magnetic body 117 may be inserted into the through-hole of the fixation part 122, and the magnetic body 117 may move along the through-hole in the Z-axis direction.

In the switching member 120 of such a structure, the movable part 121 may be in contact with the fixation part 122 according to the movement of the core body 11 or may be spaced apart from the fixation part 122. If there is no pressure in the Z-axis direction applied to the core body 11, the movable part 121 may be located in an initial position in contact with the fixation part 122. On the other hand, when the core body 11 moves to the elastic member 118 by the pressure applied in the Z-axis direction, the movable part 121 may be spaced apart from the fixation part 122.

The stylus pen 10f may include a plurality of conductive contacts CP11 to CP18 and a plurality of conductive wires W11 to W14 for the electrical connection of the capacitor unit 13 (resonant capacitor C and additional capacitor $C_P$) and the inductor unit 14 (the coil 116).

The contacts CP11 and CP12 may be located in the capacitor unit 13 and, may be electrically connected to both ends of the additional capacitor $C_P$, respectively.

The contacts CP13 and CP14 may be located in the fixation member 119 or the capacitor unit 13. The contacts CP13 and CP14 may be electrically connected to both ends of at least one resonant capacitor C, respectively. The contacts CP13 and CP14 may also be electrically connected to both ends of the coil 116, respectively.

The contacts CP15 and CP16 may be located in the movable part 121 of the switching member 120. The contacts CP15 and CP16 may be electrically connected to the contacts CP13 and CP14 through the wires W13 and W14, respectively. Accordingly, the contacts CP15 and CP16 may be electrically connected to both ends of the coil 116, respectively.

The contacts CP17 and CP18 may be located in the fixation part 122 of the switching member 120. The contacts CP17 and CP18 may be electrically connected to the contacts CP11 and CP12 through the wires W11 and W12, respectively. Accordingly, the contacts CP17 and CP18 may be electrically connected to both ends of the additional capacitor Cp, respectively.

The contacts CP11 to CP18 may be implemented in a variety of forms in which the electrical connection is possible such as a conductive pad, a conductive tap, and a conductive bar (e.g., metal bar).

When the movable part 121 of the switching member 120 contacts the fixation part 122, the contacts CP15 and CP16 located in the movable part 121 may be electrically connected to the contacts CP17 and CP18 located in the fixation part 122, respectively. For example, when the movable part 121 and the fixation part 122 contact each other, the contact CP15 may be electrically connected to the contact CP17, and the contact CP16 may be electrically connected to the contact CP18. Mutual electrical connections between the contacts CP15 and CP16 and the contacts CP17 and CP18 may also be released when the movable part 121 of the switching member 120 is spaced apart from the fixation part 122.

When the movable part 121 of the switching member 120 is in contact with the fixation part 122, an additional conductive bar (not illustrated), a contact hole (not illustrated), and a via hole (not illustrated) may also be used in order to electrically connect the contacts CP15 and CP16 located in the movable part 121 and the contacts CP17 and CP18 located in the fixation part 122.

Due to the structure, in the case of the stylus pen 10f, the electrical connection between the additional capacitor Cp and the coil 116 may be switched according to whether the movable part 121 of the switching member 120 being in contact with the fixation part 122.

Referring to FIG. 16A, in a state in which the core body 11 is not in contact with the touch screen 20 ('HOVER' state), there is no pressure applied to the Z-axis direction to the core body 11, and the core body 11 may maintain the initial position without movement. Therefore, the movable part 121 and the magnetic body 117 may also maintain the initial position without movement, and the ferrite core 115 and the magnetic body 117 may be close to each other or may maintain a very close spacing distance. At the initial position, the movable part 121 may maintain a state of contacting the fixation part 122. Therefore, by maintaining a state in which the contacts CP15 and CP16 of the movable part 121 are electrically connected to the contacts CP17 and CP18 of the fixation part 122, both ends of the additional capacitor Cp may be electrically connected to both ends of the coil 116.

Referring to FIG. 16B, when the pen pressure is applied to the stylus pen 10f ('Pressure' state) in the state in which one end portion of the core body 11 contacts the touch screen 20, the core body 11 may move in the Z-axis direction according to the pen pressure. Accordingly, the movable part 121 and the magnetic body 117 also move in the Z-axis direction by the movement distance of the core body 11, so the spacing distance between the magnetic body 117 and the ferrite core 115 may also increase.

When the movable part 121 moves to the elastic member 118 by the pen pressure, the movable part 121 and the fixation part 122 are spaced apart from each other, and the electrical connections between the contacts CP15 and CP16 of the movable part 121 and the contacts CP17 and CP18 of the fixation part 122 may be released. Thus, the electrical connection between the additional capacitor Cp and the coil 116 may also be released.

In the stylus pen 10f of FIG. 16, both ends of each wire W11, W12, W13, or W14 may be coupled to each corresponding contact CP11, CP12, CP13, CP14, CP15, CP16, CP17, or CP18 by a soldering scheme. In addition, both end portions of the coil 116 may also be attached to each contact CP13 or CP14. Therefore, in the stylus pen 10f, the soldering work may be required in eight contacts CP11, CP12, CP13, CP14, CP15, CP16, CP17, CP18 for the electrical connection between the capacitor unit 13 (the resonant capacitor C and the additional capacitor Cp), and the inductor unit 14 (the coil 116).

Figure 17:
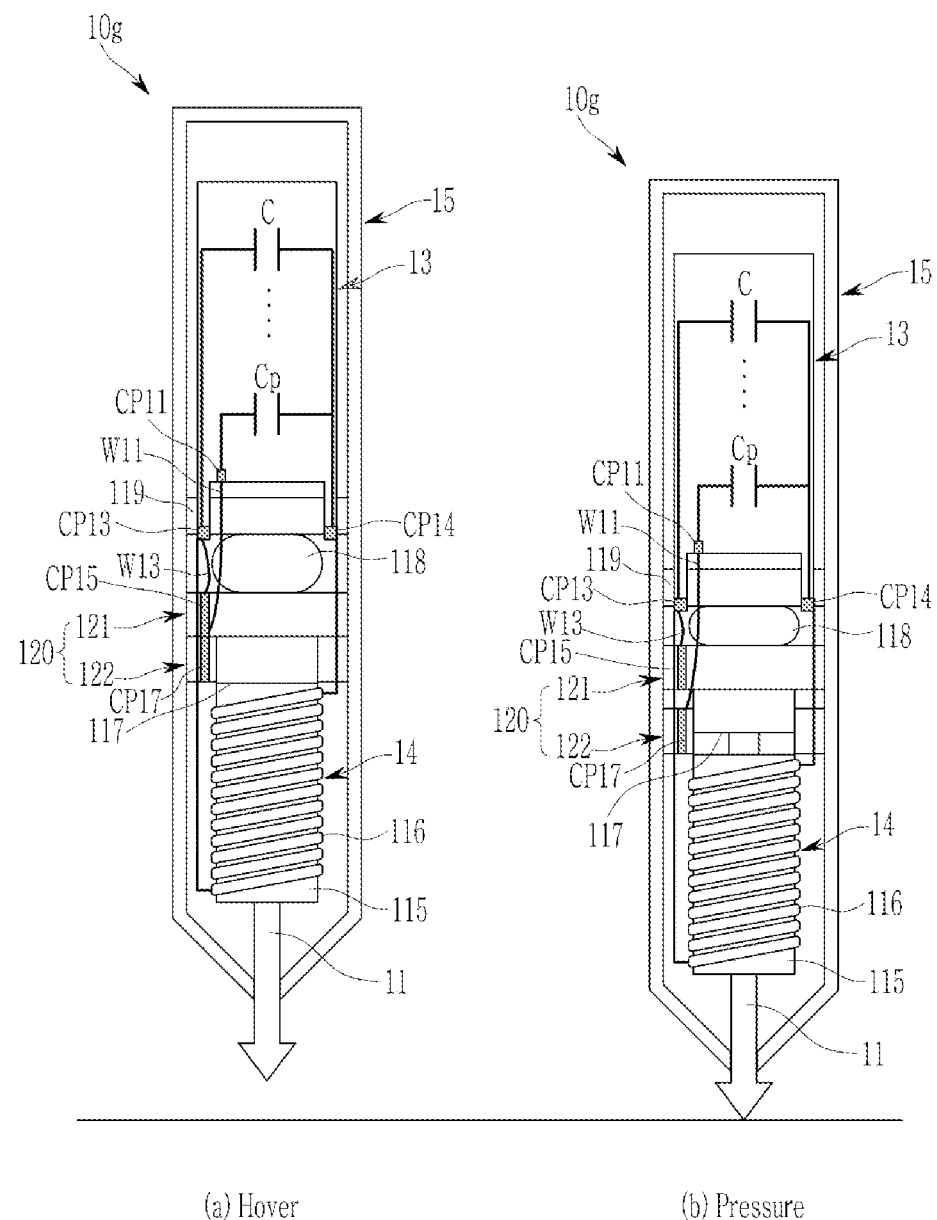
FIG. 17 schematically illustrates a stylus pen 10f according to a fifth example embodiment.

FIG. 17 schematically illustrates a stylus pen 10g according to a fifth example embodiment.

Referring to FIG. 17, the stylus pen 10g according to the fifth example embodiment may include a plurality of conductive contacts CP11, CP13, C14, CP15, and CP17, and a plurality of conductive wires W11 and W13 for the electrical connection of the capacitor unit 13 (the resonant capacitor C and the additional capacitor $C_P$), and the inductor unit 14 (the coil 116). The stylus pen 10g may be a form in which some contacts and wires are omitted from the stylus pen 10f according to the fourth example embodiment described above.

The contact CP11 may be located in the capacitor unit 13, and may be electrically connected to one end of the additional capacitor Cp. The other end of the additional capacitor Cp may maintain an electrical connection state with the resonant capacitor C regardless of the movement of the core body 11. Therefore, in the stylus pen 10g, compared to the stylus pen 10f of FIG. 16, some contacts CP12, CP16, and CP18 in FIG. 16 and the wires W12 and W14 in FIG. 16 for switching the electrical connection the other end of the additional capacitor Cp and the coil 116 may be omitted.

The contacts CP13 and CP14 may be located in the fixation member 119 or the capacitor unit 13. The contacts CP13 and CP14 may be electrically connected to both ends of at least one resonant capacitor C, respectively. The contacts CP13 and CP14 may also be electrically connected to both ends of the coil 116, respectively. The contact CP14 may also be electrically connected to the other end of the additional capacitor Cp.

The contact CP15 may be located in the movable part 121 of the switching member 120 and may be electrically connected to the contact CP13 through the wire W13. Accordingly, the contact CP15 may be electrically connected to one end of the coil 116.

The contact CP17 may be located in the fixation part 122 of the switching member 120 and may be electrically connected to the contact CP11 through the wire W11. Accordingly, the contact CP17 may be electrically connected to one end of the additional capacitor Cp.

The contacts CP11, CP13, CP14, CP15, and CP17 may be implemented in a variety of forms in which the electrical connection is possible such as the conductive pad, the conductive tap, and the conductive bar (e.g., metal bar).

When the movable part 121 of the switching member 120 contacts the fixation part 122, the contact CP15 located in the movable part 121 may be electrically connected to the contact CP17 located in the fixation part 122. A mutual electrical connection between the contacts CP15 and CP17 may also be released when the movable part 121 of the switching member 120 is spaced apart from the fixation part 122.

Due to the structure, in the case of the stylus pen 10g, the electrical connection between one end of the additional capacitor Cp and one end of the coil 116 may be switched according to whether the movable part 121 of the switching member 120 being in contact with the fixation part 122.

Referring to FIG. 17A, in the state in which the core body 11 is not in contact with the touch screen 20 ('HOVER' state), the movable part 121 may be in contact with the fixation part 122. Therefore, by maintaining a state in which the contact CP15 of the movable part 121 are electrically connected to the contact CP17 of the fixation part 122, both ends of the additional capacitor Cp may be electrically connected to both ends of the coil 116.

Referring to FIG. 17B, when the pen pressure is applied to the stylus pen 10g ('Pressure' state) in the state in which one end portion of the core body 11 contacts the touch screen 20, the core body 11 may move in the Z-axis direction according to the pen pressure. Accordingly, the movable part 121 and the magnetic body 117 may also move in the Z-axis direction by the movement distance of the core body 11. When the movable part 121 moves to the elastic member 118 by the pen pressure, the movable part 121 and the fixation part 122 are spaced apart from each other, and the electrical connections between the contact CP15 of the movable part 121 and the contact CP17 of the fixation part 122 may be released. Thus, one end of the additional capacitors Cp may be separated from the coil 116.

In the stylus pen 10g of FIG. 17, both ends of each wire W11 or W13 may be attached to each corresponding contact CP11, CP13, CP15, or CP17 by the soldering scheme. In addition, both end portions of the coil 116 may also be attached to each contact CP13 or CP14. Therefore, in the stylus 10g, the soldering work may be required in five contacts CP11, CP13, CP14, CP15, and CP17 for the electrical connection between the capacitor unit 13 (the resonant capacitor C and the additional capacitor Cp), and the inductor unit 14 (the coil 116).

Figure 18:
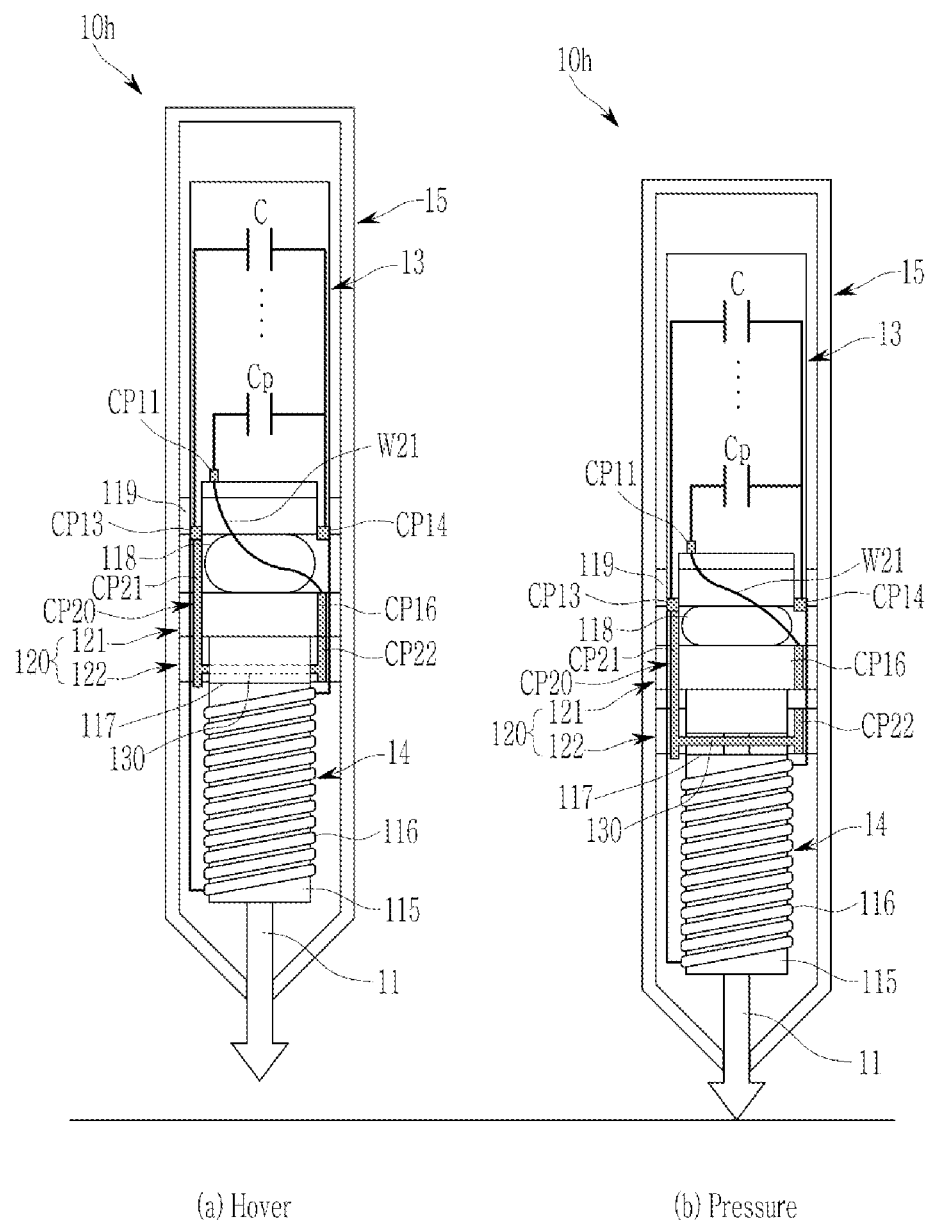
FIG. 18 schematically illustrates a stylus pen 10f according to a sixth example embodiment.

FIG. 18 schematically illustrates a stylus pen 10h according to a sixth example embodiment.

Referring to FIG. 18, the stylus pen 10h according to the sixth example embodiment may include a plurality of contacts CP11, CP13, CP14, and CP16, a wire W21, and a contact structure CP20 for the electrical connection of the capacitor unit 13 (the resonant capacitor C and the additional capacitor $C_P$), and the inductor unit 14 (the coil 116). The stylus pen 10h may be a form in which some contacts and wires are omitted, or the contact structure CP 20 or the wire W21 is replaced as compared with the stylus pen 10f according to the fourth example embodiment.

The contact CP11 may be located in the capacitor unit 13 and, may be electrically connected to one end of the additional capacitor Cp. The other end of the additional capacitor Cp may maintain an electrical connection state with the resonant capacitor C regardless of the movement of the core body 11.

The contacts CP13 and CP14 may be located in the fixation member 119 or the capacitor unit 13. The contacts CP13 and CP14 may be electrically connected to both ends of at least one resonant capacitor C. The contacts CP13 and CP14 may also be electrically connected to both ends of the coil 116, respectively. The contact CP14 may also be electrically connected to the other end of the additional capacitor Cp.

The contact CP16 may be located in the movable part 121 of the switching member 120 and may be electrically connected to the contact CP11 through the wire W21. Accordingly, the contact CP16 may be electrically connected to one end of the additional capacitor Cp.

The contacts CP11, CP13, CP14, and CP16 may be implemented in a variety of forms in which the electrical connection is possible such as the conductive pad, the conductive tap, and the conductive bar (e.g., metal bar).

The contact structure CP20 may perform a function to switch the electrical connection between one end of the additional capacitor Cp and one end of the coil 116. The contact structure CP 20 may include a connection unit 130 that electrically connects two conductive contacts CP21 and CP22, and two contacts CP21 and CP22.

One end portion of the contact CP21 may be located in the fixation part 122 of the switching member 120, and the other end portion may be extended in the Z-axis direction to be coupled to penetrate the through-hole formed in the movable part 121. The other end portion of the contact CP21 may also be further extended in the Z-axis direction and electrically coupled to the contact CP13. Accordingly, the contact CP21 may be electrically connected to one end of the coil 116. The contact CP21 may be electrically connected to the contact CP13 by the attachment scheme or electrically connected to the contact CP13 by a contact scheme. The contact CP21 is penetrated and coupled to the through-hole in the Z-axis direction formed in the movable part 121 to maintain a fixed position even if the movable part 121 moves in the Z-axis direction. Even if the contact CP21 moves in the Z-axis direction, the contact CP21 may continue to maintain the electrical connection state to one end of the coil 116.

One end portion of the contact CP22 may be located in the fixation part 122 of the switching member 120, and the other end portion may be extended. The contact CP22 may be selectively electrically connected to the contact CP16. When the movable part 121 and the fixation part 122 are in contact with each other, the contact CP22 may be electrically connected to the contact CP16. The electrical connection between the contact CP22 and the contact CP16 may be blocked when the movable part 121 and the fixation part 122 are spaced apart. Therefore, the contact CP22 may be selectively electrically connected to one end of the additional capacitor Cp with the movement of the movable part 121.

The connection unit 130 may be located in the fixation part 122 of the switching member 120 and may electrically connect the contact CP21 and the contact CP22.

Due to the structure, in the case of the stylus pen 10h, the electrical connection between one end of the additional capacitor Cp and one end of the coil 116 may be switched according to whether the movable part 121 of the switching member 120 being in contact with the fixation part 122.

Referring to FIG. 18A, in the state in which the core body 11 is not in contact with the touch screen 20 ('HOVER' state), the movable part 121 may be in contact with the fixation part 122. Therefore, by maintaining the electrical connection between the contact CP16 of the movable part 121 and the contact structure of the fixation part 122, both ends of the additional capacitor Cp may be electrically connected to both ends of the coil 116.

Referring to FIG. 18B, when the pen pressure is applied to the stylus pen 10h ('Pressure' state) in the state in which one end portion of the core body 11 contacts the touch screen 20, the core body 11 may move in the Z-axis direction according to the pen pressure. Accordingly, the movable part 121 and the magnetic body 117 may also move in the Z-axis direction by the movement distance of the core body 11. When the movable part 121 moves to the elastic member 118 by the pen pressure, the movable part 121 and the fixation part 122 are spaced apart from each other, and the electrical connections between the contact CP16 of the movable part 121 and the contact structure CP20 of the fixation part 122 may be released. Thus, one end of the additional capacitors Cp may be separated from the coil 116.

In the stylus pen 10h of FIG. 18, both ends of the wire W21 may be attached to each corresponding contact CP11 or CP16 by the soldering scheme. In addition, both end portions of the coil 116 may also be attached to each contact CP13 or CP14. In addition, one end portion of the contact CP21 may also be further attached to the contact CP 13 by the soldering scheme. Therefore, in the stylus pen 10h, the soldering work may be required in four contacts CP11, CP13, CP14, and CP16 for the electrical connection between the capacitor unit 13 (the resonant capacitor C and the additional capacitor Cp), and the inductor unit 14 (the coil 116).

Figure 19:
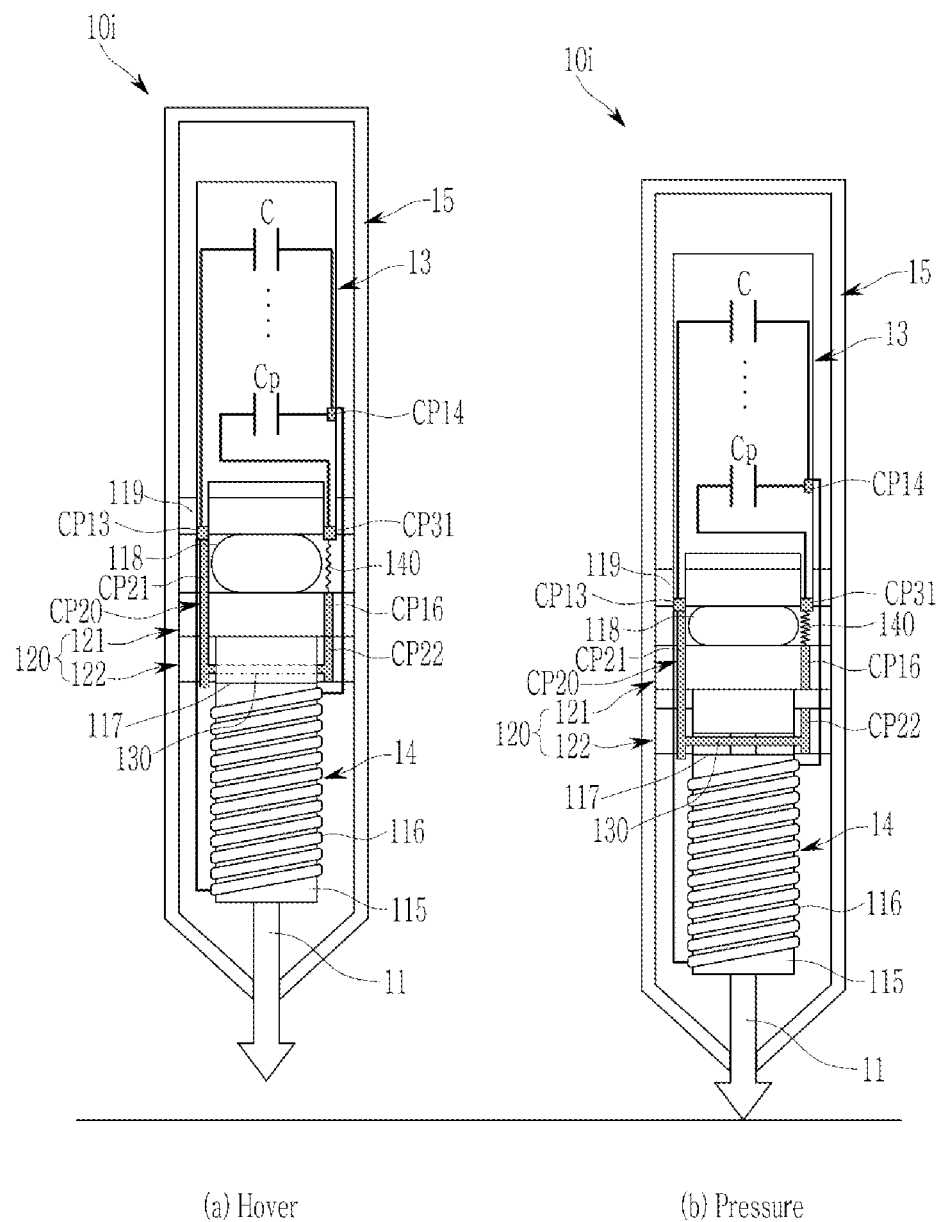
FIG. 19 schematically illustrates a stylus pen 10f according to a seventh example embodiment.

FIG. 19 schematically illustrates a stylus pen 10i according to a seventh example embodiment.

Referring to FIG. 19, the stylus pen 10i according to the seventh example embodiment may include a plurality of contacts CP13, CP14, CP16, and CP31, a conductive elastic member 140, and the contact structure CP 20 for the electrical connection of the capacitor unit 13 (the resonant capacitor C and the additional capacitor $C_P$), and the inductor unit 14 (the coil 116). The stylus pen 10i may be a form in which the wire is omitted and the conductive elastic member 140 is added as compared to the stylus pen 10h according to the sixth example embodiment.

The contact CP31 may be located in the capacitor unit 13 or the fixation member 119, and electrically connected to one end of the additional capacitor Cp. The other end of the additional capacitor Cp may maintain an electrical connection state with the resonant capacitor C regardless of the movement of the core body 11.

The contacts CP13 and CP14 may be located in the fixation member 119 or the capacitor unit 13. The contacts CP13 and CP14 may be electrically connected to both ends of at least one resonant capacitor C. The contacts CP13 and CP14 may also be electrically connected to both ends of the coil 116, respectively. The contact CP14 may also be electrically connected to the other end of the additional capacitor Cp.

The contact CP16 may be located in the movable part 121 of the switching member 120 and may be electrically connected to the contact CP31 through a conductive elastic member, i.e., the conductive spring 140. Accordingly, the contact CP16 may be electrically connected to one end of the additional capacitor Cp without the soldering work. The conductive spring 140 may maintain a state in which both ends of the conductive spring 140 are electrically connected to the contacts CP31 and CP16 regardless of movement of the movable part 121.

The contacts CP13, CP14, CP16, and CP31 may be implemented in a variety of forms in which the electrical connection is possible such as the conductive pad, the conductive tap, and the conductive bar (e.g., metal bar).

The contact structure CP20 may perform a function to switch the electrical connection between one end of the additional capacitor Cp and one end of the coil 116. The contact structure CP 20 may include a connection unit 130 that electrically connects two conductive contacts CP21 and CP22, and two contacts CP21 and CP22.

One end portion of the contact CP21 may be located in the fixation part 122 of the switching member 120, and the other end portion may be extended in the Z-axis direction to be coupled to penetrate the through-hole formed in the movable part 121. The other end portion of the contact CP21 may also be further extended in the Z-axis direction and electrically coupled to the contact CP13. Accordingly, the contact CP21 may be electrically connected to one end of the coil 116. The contact CP21 may be electrically connected to the contact CP13 by the attachment scheme or electrically connected to the contact CP13 by a contact scheme. The contact CP21 is penetrated and coupled to the through-hole in the Z-axis direction formed in the movable part 121 to maintain a fixed position even if the movable part 121 moves in the Z-axis direction. Even if the contact CP21 moves in the Z-axis direction, the contact CP21 may continue to maintain the electrical connection state to one end of the coil 116.

One end portion of the contact CP22 may be located in the fixation part 122 of the switching member 120, and the other end portion may be extended. The contact CP22 may be selectively electrically connected to the contact CP16. When the movable part 121 and the fixation part 122 are in contact with each other, the contact CP22 may be electrically connected to the contact CP16. The electrical connection between the contact CP22 and the contact CP16 may be blocked when the movable part 121 and the fixation part 122 are spaced apart. Therefore, the contact CP22 may be selectively electrically connected to one end of the additional capacitor Cp with the movement of the movable part 121.

The connection unit 130 may be positioned in the fixation part 122 of the switching unit 120, and may electrically connect a contact CP21 electrically connected to one end of the coil 116 and a contact CP 22 selectively electrically connected to one end of the additional capacitor Cp.

Due to the structure, in the case of the stylus pen 10i, the electrical connection between one end of the additional capacitor Cp and one end of the coil 116 may be switched according to whether the movable part 121 of the switching member 120 being in contact with the fixation part 122.

Referring to FIG. 19A, in the state in which the core body 11 is not in contact with the touch screen 20 (HOVER' state), the movable part 121 may be in contact with the fixation part 122. Therefore, by maintaining a state in which the contact CP16 of the movable part 121 are electrically connected to the contact structure CP20 of the fixation part 122, both ends of the additional capacitor Cp may be electrically connected to both ends of the coil 116.

Referring to FIG. 19B, when the pen pressure is applied to the stylus pen 10*i* ('Pressure' state) in the state in which one end portion of the core body 11 contacts the touch screen 20, the core body 11 may move in the Z-axis direction according to the pen pressure. Accordingly, the movable part 121 and the magnetic body 117 may also move in the Z-axis direction by the movement distance of the core body 11. When the movable part 121 moves to the elastic member 118 by the pen pressure, the movable part 121 and the fixation part 122 are spaced apart from each other, and the electrical connections between the contact CP16 of the movable part 121 and the contact structure CP20 of the fixation part 122 may be released. Thus, one end of the additional capacitors Cp may be separated from the coil 116.

In the stylus pen 10*i* of FIG. 19, the conductive spring 140 may not require a separate soldering work. Both end portions of the coil 116 may be attached to the contacts CP13 and CP14, respectively. In addition, one end portion of the contact CP21 may also be further attached to the contact CP 13 by the soldering scheme. Therefore, in the stylus pen 10*i*, the soldering work may be required in two contacts CP13 and CP14 for the electrical connection between the capacitor unit 13 (the resonant capacitor C and the additional capacitor Cp), and the inductor unit 14 (the coil 116).

Figure 20:
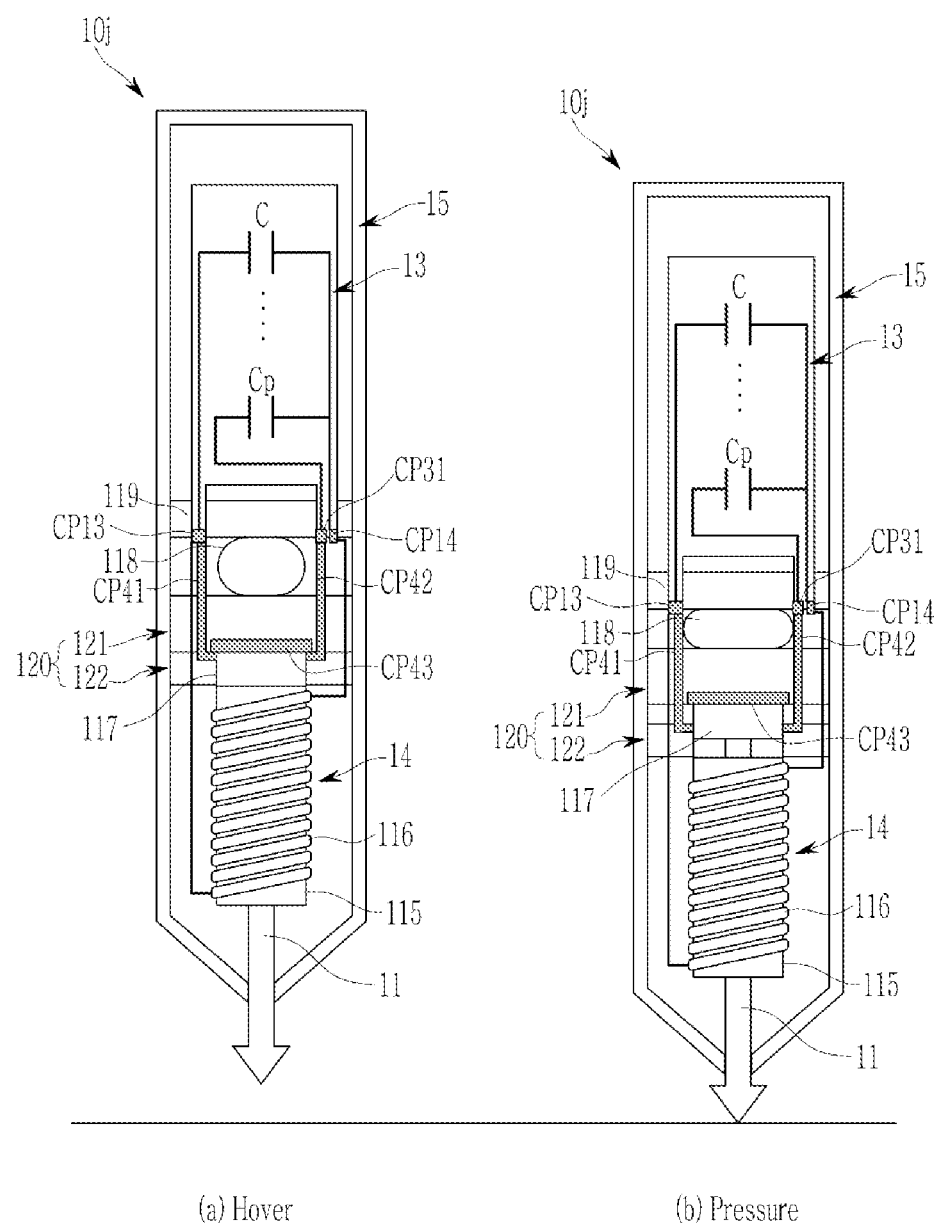
FIG. 20 schematically illustrates a stylus pen 10f according to an eighth example embodiment.

FIG. 20 schematically illustrates a stylus pen 10*j* according to an eighth example embodiment.

Referring to FIG. 20, the stylus pen 10*j* according to the eighth example embodiment may include a plurality of contacts CP13, CP14, CP31, CP41, and CP42, and a contact CP43 for the electrical connection of the capacitor unit 13 (the resonant capacitor C and the additional capacitor $C_P$), and the inductor unit 14 (the coil 116).

The contact CP31 may be located in the capacitor unit 13 or a fixation member 119, and electrically connected to one end of the additional capacitor Cp. The other end of the additional capacitor Cp may maintain an electrical connection state with the resonant capacitor C regardless of the movement of the core body 11.

The contacts CP13 and CP14 may be located in the fixation member 119 or the capacitor unit 13. The contacts CP13 and CP14 may be electrically connected to both ends of at least one resonant capacitor C. The contacts CP13 and CP14 may also be electrically connected to both ends of the coil 116, respectively. The contact CP14 may also be electrically connected to the other end of the additional capacitor Cp.

The contacts CP41, CP42, and CP43 may perform a function to switch the electrical connection between one end of the additional capacitor Cp and one end of the coil 116.

One end portion of the contact CP41 may be located in the fixation part 122 of the switching member 120, and the other end portion may be extended in the Z-axis direction to be coupled to penetrate the through-hole formed in the movable part 121. The other end portion of the contact CP41 may also be further extended in the Z-axis direction and electrically coupled to the contact CP13. Accordingly, the contact CP41 may be electrically connected to one end of the coil 116. The contact CP41 may be electrically connected to the contact CP13 by the attachment scheme or electrically connected to the contact CP13 by a contact scheme. The contact CP41 is penetrated and coupled to the through-hole in the Z-axis direction formed in the movable part 121 to maintain a fixed position even if the movable part 121 moves in the Z-axis direction. Therefore, even if the contact CP41 moves in the Z-axis direction, the contact CP41 may continue to maintain the electrical connection state to one end of the coil 116.

One end portion of the contact CP42 may be located in the fixation part 122 of the switching member 120, and the other end portion may be extended in the Z-axis direction to be coupled to penetrate the through-hole formed in the movable part 121. The other end portion of the contact CP42 may also be further extended in the Z-axis direction and electrically coupled to the contact CP31. Accordingly, the contact CP42 may be electrically connected to one end of the additional capacitor Cp through the contact CP31. The contact CP42 may be electrically connected to the contact CP31 by the attachment scheme or electrically connected to the contact CP31 by a contact scheme. The contact CP42 is penetrated and coupled to the through-hole in the Z-axis direction formed in the movable part 121 to maintain a fixed position even if the movable part 121 moves in the Z-axis direction. Therefore, even if the movable part 121 moves in the Z-axis direction, the contact CP42 may continue to maintain the electrical connection state to one end of the additional capacitor Cp.

The contact CP43 may be located on a surface of the movable part 121, which faces the magnetic body 117. The contact CP43 may be selectively electrically connected to the contact CP41 and the contact CP42 according to the location of the movable part 121. At the initial position of the movable part 121, that is, in the state in which the movable part 121 is in contact with the fixation part 122, both end portions of the contact CP43 may maintain a state of being electrically connected to the contacts CP41 and CP42, respectively. When the movable part 121 moves from the initial position to the elastic member 118, that is, when the movable part 121 and the fixation part 122 are spaced apart from each other, the electrical connections of both end portions of the contact CP43 with the contacts CP41 and CP42 may be released.

Due to the structure, in the case of the stylus pen 10*j*, the electrical connection between one end of the additional capacitor Cp and one end of the coil 116 may be switched according to whether the movable part 121 of the switching member 120 being in contact with the fixation part 122.

Referring to FIG. 20A, in the state in which the core body 11 is not in contact with the touch screen 20 ('HOVER' state), the movable part 121 may be in contact with the fixation part 122. As a result, by maintaining a state in which both end portions of the contact CP43 are electrically connected to the contacts CP41 and CP42, respectively, both ends of the additional capacitor Cp may be all electrically connected to the coil 116.

Referring to FIG. 20B, when the pen pressure is applied to the stylus pen 10*j* ('Pressure' state) in the state in which one end portion of the core body 11 contacts the touch screen 20, the core body 11 may move in the Z-axis direction according to the pen pressure. Accordingly, the movable part 121 and the magnetic body 117 may also move in the Z-axis direction by the movement distance of the core body 11. When the movable part 121 moves to the elastic member 118 by the pen pressure, the movable part 121 and the fixation part 122 are spaced apart from each other, and the electrical connections between the contact CP43 of the movable part 121 and the contact CP41 and CP42 of the fixation part 122 may be released. Thus, one end of the additional capacitors Cp may be separated from the coil 116.

In the stylus pen 10*j* of FIG. 20, the electrical connection between the contacts CP41, CP42, and CP43 may not require the soldering work. Both end portions of the coil 116 may be attached to the contacts CP13 and CP14, respectively. Therefore, in the stylus pen 10*j*, the soldering work may be required in two contacts CP13 and CP14 for the electrical connection between the capacitor unit 13 (the resonant capacitor C and the additional capacitor Cp), and the inductor unit 14 (the coil 116). As necessary, the soldering work for attaching the contacts CP41 and CP42 to the contacts CP13 and CP14, respectively may be additionally required.

Figure 21:
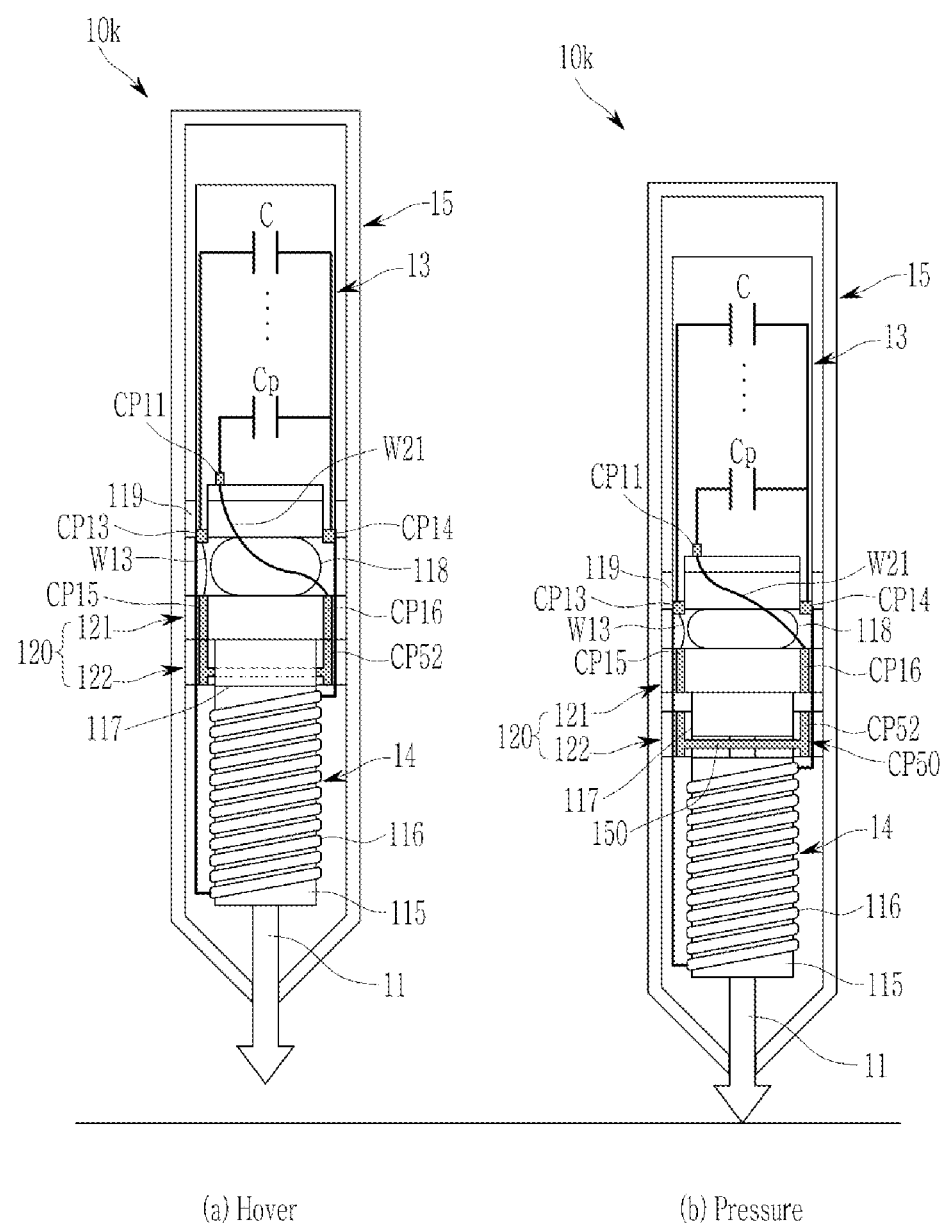
FIG. 21 schematically illustrates a stylus pen 10f according to a ninth example embodiment.

FIG. 21 schematically illustrates a stylus pen 10*k* according to a ninth example embodiment.

Referring to FIG. 21, the stylus pen 10*k* according to the ninth example embodiment may include the plurality of contacts CP11, CP13, CP14, CP15, and CP16, the wire W21, and a contact structure CP50 for the electrical connection of the capacitor unit 13 (the resonant capacitor C and the additional capacitor $C_P$), and the inductor unit 14 (the coil 116). The stylus pen 10*k* may be a form in which some contacts and wires are omitted, or the contact structure CP 50 or the wire W21 is replaced as compared with the stylus pen 10*f* according to the fourth example embodiment.

The contact CP11 may be located in the capacitor unit 13 and, may be electrically connected to one end of the additional capacitor Cp. The other end of the additional capacitor Cp may maintain an electrical connection state with the resonant capacitor C regardless of the movement of the core body 11.

The contacts CP13 and CP14 may be located in the fixation member 119 or the capacitor unit 13. The contacts CP13 and CP14 may be electrically connected to both ends of at least one resonant capacitor C. The contacts CP13 and CP14 may also be electrically connected to both ends of the coil 116, respectively. The contact CP14 may also be electrically connected to the other end of the additional capacitor Cp.

The contacts CP15 and CP16 may be located in the movable part 121 of the switching member 120. The contact CP15 may be electrically connected to the contact CP13 through a wire W13. The contact CP16 may be electrically connected to the contact CP11 through a wire W21. Therefore, the contact CP15 may be electrically connected to one end of the coil 116, and electrically connected to one end of the additional capacitor Cp.

The contacts CP11, CP13, CP14, CP15, and CP16 may be implemented in a variety of forms in which the electrical connection is possible such as the conductive pad, the conductive tap, and the conductive bar (e.g., metal bar).

The contact structure CP50 may perform a function to switch the electrical connection between one end of the additional capacitor Cp and one end of the coil 116. The contact structure CP50 may include a connection unit 150 that electrically connects two conductive contacts CP51 and CP52, and two contacts CP51 and CP52.

One end portion of the contact CP51 may be located in the fixation part 122 of the switching member 120, and the other end portion may be extended. The contact CP51 may be selectively electrically connected to the contact CP15. When the movable part 121 and the fixation part 122 are in contact with each other, the contact CP51 may be electrically connected to the contact CP15. The electrical connection between the contact CP51 and the contact CP15 may be blocked when the movable part 121 and the fixation part 122 are spaced apart. Therefore, the contact CP51 may be selectively electrically connected to one end of the coil 116 with the movement of the movable part 121.

One end portion of the contact CP52 may be located in the fixation part 122 of the switching member 120, and the other end portion may be extended. The contact CP52 may be selectively electrically connected to the contact CP16. When the movable part 121 and the fixation part 122 are in contact with each other, the contact CP52 may be electrically connected to the contact CP16. The electrical connection between the contact CP52 and the contact CP16 may be blocked when the movable part 121 and the fixation part 122 are spaced apart. Therefore, the contact CP52 may be selectively electrically connected to one end of the additional capacitor Cp with the movement of the movable part 121.

The connection unit 150 may be located in the fixation part 122 of the switching member 120 and may electrically connect the contact CP51 and the contact CP52.

Due to the structure, in the case of the stylus pen 10*k*, the electrical connection between one end of the additional capacitor Cp and one end of the coil 116 may be switched according to whether the movable part 121 of the switching member 120 being in contact with the fixation part 122.

Referring to FIG. 21A, in the state in which the core body 11 is not in contact with the touch screen 20 ('HOVER' state), the movable part 121 may be in contact with the fixation part 122. Therefore, by maintaining the electrical connection between the contacts CP15 and CP16 of the movable part 121 and the contact structure CP50 of the fixation part 122, both ends of the additional capacitor Cp may be electrically connected to both ends of the coil 116.

Referring to FIG. 21B, when the pen pressure is applied to the stylus pen 10*k* ('Pressure' state) in the state in which one end portion of the core body 11 contacts the touch screen 20, the core body 11 may move in the Z-axis direction according to the pen pressure. Accordingly, the movable part 121 and the magnetic body 117 may also move in the Z-axis direction by the movement distance of the core body 11. When the movable part 121 moves to the elastic member 118 by the pen pressure, the movable part 121 and the fixation part 122 are spaced apart from each other, and the electrical connections between the contacts CP15 and CP16 of the movable part 121 and the contact structure CP50 of the fixation part 122 may be released. Thus, one end of the additional capacitors Cp may be separated from the coil 116.

In the stylus pen 10*k* of FIG. 21, both end portions of each wire W13 or W21 may be attached to each corresponding contacts CP13 and CP15, or CP11 and CP16 by the soldering scheme. In addition, both end portions of the coil 116 may also be attached to each contact CP13 or CP14. Therefore, in the stylus 10*k*, the soldering work may be required in five contacts CP11, CP13, CP14, CP15, and CP16 for the electrical connection between the capacitor unit 13 (the resonant capacitor C and the additional capacitor Cp), and the inductor unit 14 (the coil 16).

The electronic devices according to various example embodiments disclosed in the present disclosure may become various types of devices. The electronic device may include, for example, a portable communication device (for example, a smart phone), a computer device, a portable multimedia device, a portable medical device, a camera, a wearable device, or a home appliance. The electronic devices according to the example embodiment of the present document are not limited to the above-described devices.

Various example embodiments of the present disclosure and terms used therein are not intended to limit technical features described in the present disclosure to specific example embodiments, and it should be understood that various example embodiments and the terms include various modifications, equivalents, or substitutes for the corresponding example embodiment. In connection with the description of the drawings, similar reference numerals may be used for similar or related components. A singular type of a noun corresponding to an item may include one or a plurality of items unless a related context is apparently differently indicated. In the present disclosure, each of phrases such as "A or B", "at least one of A and B", "at least one of A or B", "A, B, or C", "at least one of A, B, and C", and "at least one of A, B, or C" may include all possible combinations of items listed together with a corresponding phrase among the phrases. Terms such as "first" or "second" may be just used for distinguishing a corresponding component from the other corresponding component and the corresponding components are not limited in other aspects (e.g., importance or order). When it is mentioned that any (e.g., first) component is "coupled" or "connected" to the other (e.g., second) component with the term "functionally" or "communicatively" or without such a term, it means that the any component may be connected to the other component directly (e.g., wiredly), wirelessly, or through a third component.

The term "module" used in the present disclosure may include a unit implemented as hardware, software, or firmware, and may be used intercompatibly with a term such as logic, a logic block, a part, or a circuit, for example. The module may become an integrally configured part or a minimum unit or a part of the part, which performs one or more functions. For example, according to an example embodiment, the module may be implemented in the form of an application-specific integrated circuit (ASIC).

Various example embodiments of the present disclosure may be implemented as software (e.g., programs) including one or more instructions stored in a storage medium (e.g., built-in memory or external memory) that can be read by a machine (e.g., electronic devices). For example, a processor (e.g., a processor) of the device (e.g., the electronic device) may call and execute at least one instruction of one or more stored instructions from the storage medium and execute the called instruction. This enables the device to be operated to perform at least one function according to the at least one called instruction. The one or more instructions may include a code generated by a compiler or a code executable by an interpreter. The machine-readable storage media may be provided as a form of non-transitory storage media. Here, 'non-transitory' just means that the storage medium is a tangible device, and does not include a signal (e.g., electromagnetic waves), and this term does not distinguish a case where data is semi-permanently stored in the storage medium and a case where the data is temporarily stored in the storage medium.

According to an example embodiment of the present disclosure, the method according to various example embodiments described above may be provided while being included in a computer program product. The computer program product may be traded between a seller and a purchaser as merchandise. The computer program product is distributed in the form of a machine-readable storage medium (for example, compact disc read only memory (CD-ROM)), or distributed (e.g., downloaded or uploaded) through an application store (e.g., Playstore™), directly between two user devices (e.g., smart phones), or online. In the case of the online distribution, at least some of the computer program products may be at least transitorily stored in a machine-readable storage medium such as a server of a manufacturer, a server of the application store, or a memory of a relay server, or temporarily generated.

According to various example embodiments, each component (e.g., module or program) of the components described above may include a singular or plurality of objects. According to various example embodiments, one or more components or operations of the above-described components may be omitted, or one or more other components or operations may be added. In general or additionally, a plurality of components (e.g. modules or programs) may be integrated into one component. In this case, the integrated component may perform one or more functions of respective components of the plurality of components in the same or similar manner as performing the function by the corresponding component of the plurality of components before the integration. According to various example embodiments, operations performed by modules, programs, or other components are executed sequentially in parallel, repeatedly, or heuristically, or one or more of the above operations may be executed in different orders or omitted, or one or more other operations may be added.

What is claimed is:

1. A stylus pen comprising:
a core body configured to serve as a tip of the stylus pen;
a resonant circuit including a ferrite core, a coil wound on an outer surface of the ferrite core, a second capacitor electrically connected to the coil, and a magnetic body spaced apart from the ferrite core by pressure applied to the core body;
a switching member configured to switch an electrical connection between a first capacitor and the coil according to the pressure applied to the core body;
at least one first contact electrically connected to the first capacitor; and
at least one second contact electrically connected to the coil and the second capacitor,
wherein the switching member electrically connects the first capacitor and the coil when the core body is not in contact with a touch screen, and blocks the electrical connection between the first capacitor and the coil when the core body contacts the touch screen, and
wherein the switching member includes:
a movable part coupled to the core body and configured to move according to a movement of the core body; and
a fixation part installed to maintain a fixed position inside a housing of the stylus pen; and
a contact state of the movable part with the fixation part is changed by the pressure applied to the core body,
wherein the core body includes a first end portion coupled to the movable part and a second end portion serving as the tip of the stylus pen,
wherein the fixation part is located between the ferrite core and the movable part, and
wherein an electrical connection between the at least one first contact and the at least one second contact is switched according to the contact state of the movable part and the fixation part.

2. The stylus pen of claim 1, wherein:
as the pressure increases, a spacing distance between the magnetic body and the ferrite core increases.

3. The stylus pen of claim 2, wherein:
a resonant frequency of the resonant circuit increases as the pressure increases.

4. The stylus pen of claim 2, wherein:
the ferrite core includes a through-hole which is penetrated in a first direction and accommodates at least a part of the core body, and
the core body includes a first end portion delivering the pressure to the magnetic body and a second end portion serving as a tip of the stylus pen, and moves in the first direction inside the through-hole by pressure applied to the second end portion.

5. The stylus pen of claim 4, further comprising:
a housing accommodating at least a part of the core body and the resonant circuit,
wherein the ferrite core is fixed inside the housing.

6. The stylus pen of claim 4, wherein:
the through-hole includes a first opening located on one surface of the ferrite core and a second opening located on the other surface of the ferrite core, and
the second end portion is exposed to the outside of the ferrite core through the first opening, and the first end portion delivers the pressure to the magnetic body through the second opening.

7. The stylus pen of claim 6, wherein:
the switching member includes
a movable part installed to be movable inside the housing of the stylus pen, and
a fixation part installed to maintain a fixed position inside the housing, and
a contact state of the movable part with the fixation part is changed by the pressure applied to the core body.

8. The stylus pen of claim 7, wherein:
the movable part maintains the state of contacting the fixation part when there is no pressure applied to the second end portion, and is spaced apart from the fixation part when the pressure is applied to the second end portion, and
the first capacitor is electrically connected to the coil when the movable part and the fixation part are in contact with each other.

9. The stylus pen of claim 8, wherein:
the movable part is located between the magnetic body and the ferrite core, and
the fixation part is located between the movable part and the ferrite core.

10. The stylus pen of claim 8, wherein:
the fixation part is located between the movable part and the ferrite core, and includes a through-hole into which the magnetic body is inserted, and
the magnetic body is located between the movable part and the ferrite core and disposed to be movable inside the through-hole.

11. The stylus pen of claim 8, further comprising:
at least one first contact located in the movable part, and electrically connected to the first capacitor; and
at least one second contact located in the fixation part, and electrically connected to the coil,
wherein an electrical connection between the at least one first contact and the at least one second contact is switched according to the contact state of the movable part and the fixation part.

12. The stylus pen of claim 8, further comprising:
at least one first contact located in the fixation part, and electrically connected to the first capacitor; and
at least one second contact located in the movable part, and electrically connected to the coil,
wherein an electrical connection between the at least one first contact and the at least one second contact is switched according to the contact state of the movable part and the fixation part.

13. The stylus pen of claim 8, further comprising:
at least one first contact located in the fixation part, and electrically connected to the first capacitor;
at least one second contact located in the fixation part, and electrically connected to the coil; and
at least one third contact located in the movable part, and switching the electrical connection between the at least one first contact and the at least second contact according to the contact state between the movable part and the fixation part,
wherein the at least one third contact electrically connects the at least one first contact to the at least one second contact in a state in which the movable part and the fixation part are in contact with each other and blocks the electrical connection between the at least one first contact and the at least one second contact in a state in which the movable part and the fixation part are spaced apart from each other.

14. The stylus pen of claim 8, wherein:
the resonant circuit further includes a second capacitor electrically connected to the coil, and
the first capacitor is connected to the second capacitor in parallel when the movable part and the fixation part are in contact with each other.

15. The stylus pen of claim 1, further comprising:
a fixation member limiting displacement of the core body inside the housing of the stylus pen, and
an elastic member located between the fixation member and the magnetic body.

16. A touch system comprising:
a stylus pen of claim 1; and
a touch apparatus outputting a first electromagnetic signal to the stylus pen, receiving a resonated second electromagnetic signal from the stylus pen, and detecting pressure applied to a core body of the stylus pen.

* * * * *